United States Patent
Mokadam

(10) Patent No.: US 12,433,710 B1
(45) Date of Patent: Oct. 7, 2025

(54) DEVICE TO RESTRAIN OPENING OF AN OFF-THE-SHELF SURGICAL INSTRUMENT

(71) Applicant: Ohio State Innovation Foundation, Columbus, OH (US)

(72) Inventor: Nahush Mokadam, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 30 days.

(21) Appl. No.: 18/962,737

(22) Filed: Nov. 27, 2024

Related U.S. Application Data

(63) Continuation of application No. PCT/US2024/054149, filed on Nov. 1, 2024.
(Continued)

(51) Int. Cl.
*A61B 90/00* (2016.01)
*A61B 17/28* (2006.01)

(52) U.S. Cl.
CPC .............. *A61B 90/03* (2016.02); *A61B 17/28* (2013.01); *A61B 2017/2808* (2013.01); *A61B 2090/035* (2016.02)

(58) Field of Classification Search
CPC ... A61B 90/03; A61B 17/28; A61B 2090/034; A61B 2090/035; A61B 2017/2808; A61B 90/11; A61B 50/20
See application file for complete search history.

(56) References Cited

U.S. PATENT DOCUMENTS

| 5,074,870 A | 12/1991 | Von Zeppelin |
| 8,663,245 B2 | 3/2014 | Francischelli et al. |

(Continued)

FOREIGN PATENT DOCUMENTS

| EP | 1694218 A2 | 8/2006 |
| WO | 2005060838 A2 | 7/2005 |

(Continued)

OTHER PUBLICATIONS

International Searching Authority (ISA/US). International Search Report and Written Opinion. PCT Application No. PCT/US2022/042503. Issued on Dec. 28, 2022. 10 pages.
(Continued)

*Primary Examiner* — Darwin P Erezo
*Assistant Examiner* — Christina C Lauer
(74) *Attorney, Agent, or Firm* — Meunier Carlin & Curfman LLC

(57) ABSTRACT

A device for retaining a medical instrument includes a main body extending along a curved longitudinal axis. The main body defines a channel extending along the curved longitudinal axis. A first slot of the main body extends in a direction substantially perpendicular to the curved longitudinal axis. A clamp member is coupled to a hinge protrusion of the main body and movable between an open and a closed configuration wherein, in the closed configuration, the clamp member encloses a portion of the first slot. A mechanical stop is coupled to the channel of the main body and configured to be moved between (i) a stationary configuration wherein the mechanical stop is fixed at a first point in the channel, and (ii) an adjustable configuration wherein the mechanical stop is movable to a second point along the channel of the main body.

24 Claims, 15 Drawing Sheets

Related U.S. Application Data

(60) Provisional application No. 63/660,694, filed on Jun. 17, 2024.

(56) References Cited

U.S. PATENT DOCUMENTS

| | | | |
|---|---|---|---|
| 8,956,278 B2 * | 2/2015 | Torrie | A61B 17/025 600/102 |
| 9,282,973 B2 | 3/2016 | Hughett, Sr. et al. | |
| 9,517,178 B2 | 12/2016 | Chancibot | |
| 10,166,024 B2 | 1/2019 | Williamson, IV et al. | |
| 10,433,854 B2 | 10/2019 | Miller et al. | |
| 10,743,885 B2 | 8/2020 | Menovsky et al. | |
| 10,799,288 B2 | 10/2020 | Fung et al. | |
| 10,925,615 B2 | 2/2021 | Deville et al. | |
| 11,389,167 B2 | 7/2022 | Clark, III et al. | |
| 2005/0149069 A1 | 7/2005 | Bertolero et al. | |
| 2008/0039879 A1 | 2/2008 | Chin et al. | |
| 2008/0208324 A1 | 8/2008 | Glithero et al. | |
| 2009/0012545 A1 | 1/2009 | Williamson, IV et al. | |
| 2009/0209986 A1 | 8/2009 | Stewart et al. | |
| 2010/0145361 A1 | 6/2010 | Francischelli et al. | |
| 2012/0029557 A1 | 2/2012 | Prestezog et al. | |
| 2012/0172850 A1 * | 7/2012 | Kappel | A61B 90/11 606/1 |
| 2015/0223813 A1 | 8/2015 | Williamson et al. | |
| 2019/0357912 A1 | 11/2019 | Privitera et al. | |
| 2021/0106336 A1 | 4/2021 | Winkler et al. | |
| 2021/0186511 A1 | 6/2021 | Shellenberger et al. | |
| 2023/0082963 A1 | 3/2023 | Mata et al. | |
| 2023/0083170 A1 | 3/2023 | Biehle et al. | |
| 2023/0083697 A1 | 3/2023 | Recker et al. | |

FOREIGN PATENT DOCUMENTS

| | | |
|---|---|---|
| WO | 2008020975 A2 | 2/2008 |
| WO | 2023034593 A1 | 3/2023 |

OTHER PUBLICATIONS

International Searching Authority (ISA/US). International Search Report and Written Opinion. Issued in PCT Application No. PCT/US2024/054146 on Jan. 17, 2025. 12 pages.

International Searching Authority (ISA/US). International Search Report and Written Opinion. Issued in PCT Application No. PCT/US2024/054149 on Jan. 17, 2025. 11 pages.

* cited by examiner

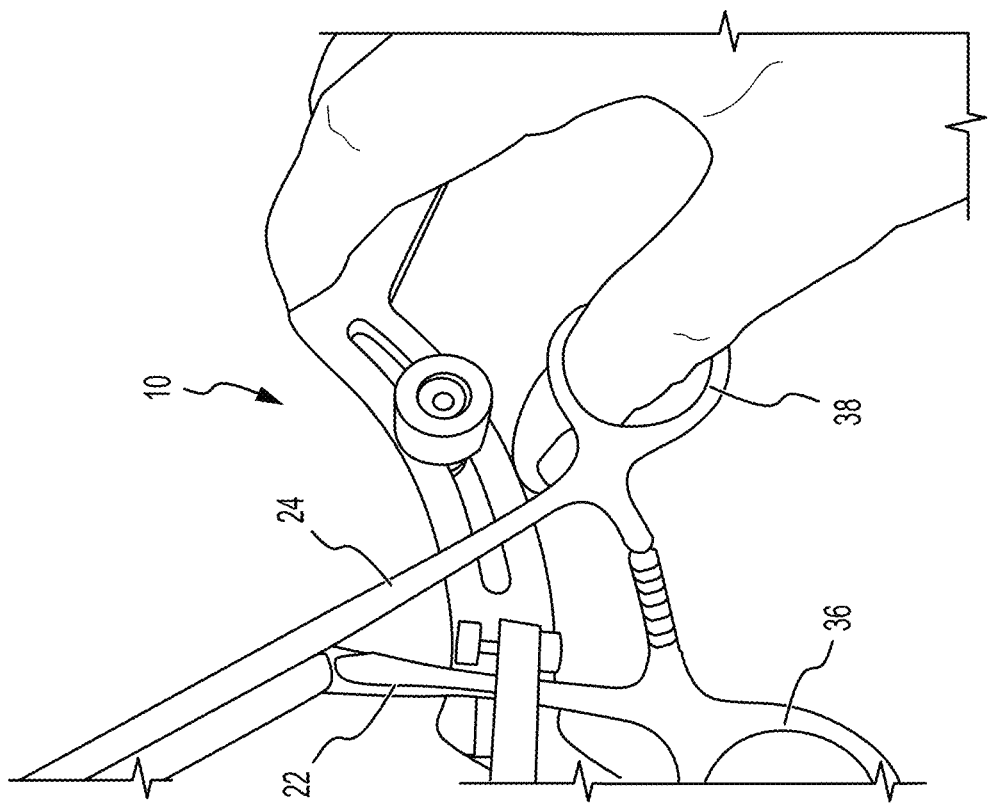
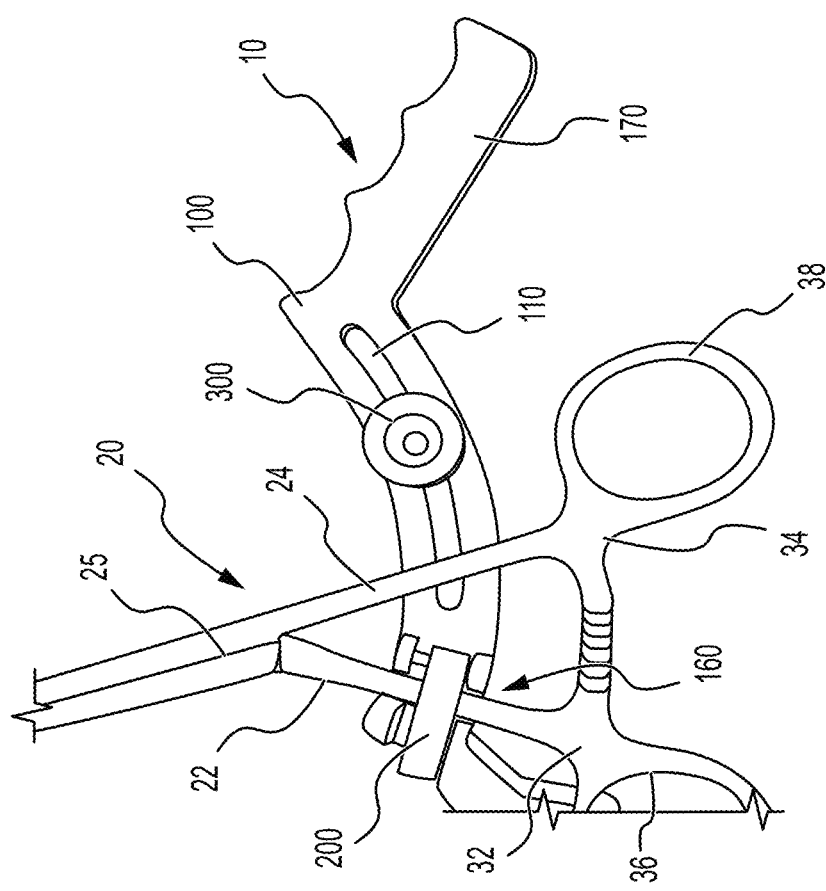
FIG. 5A
FIG. 5B

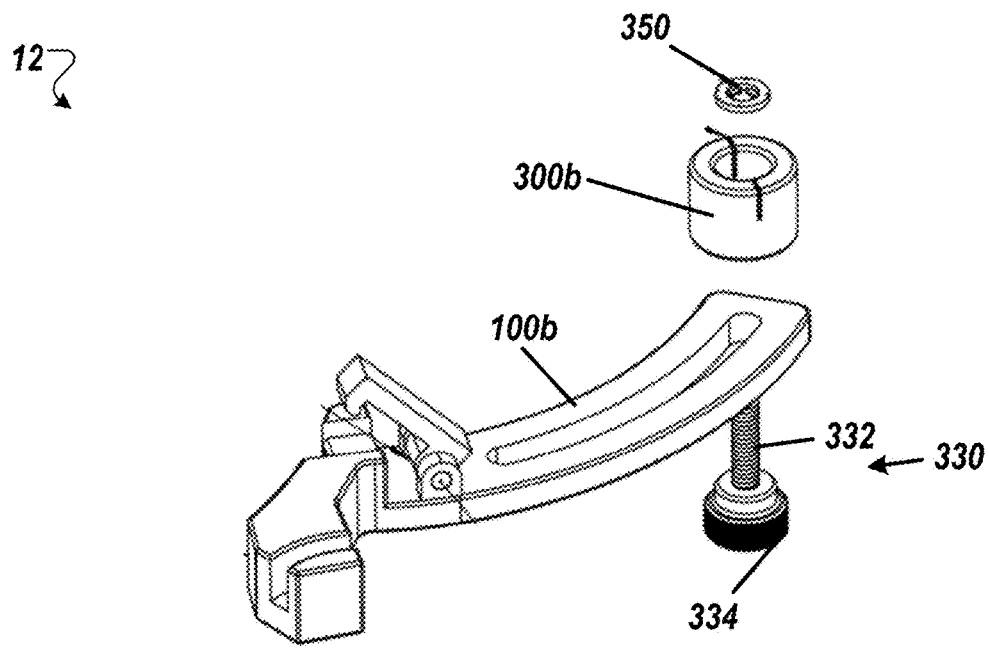
*FIG. 6A*
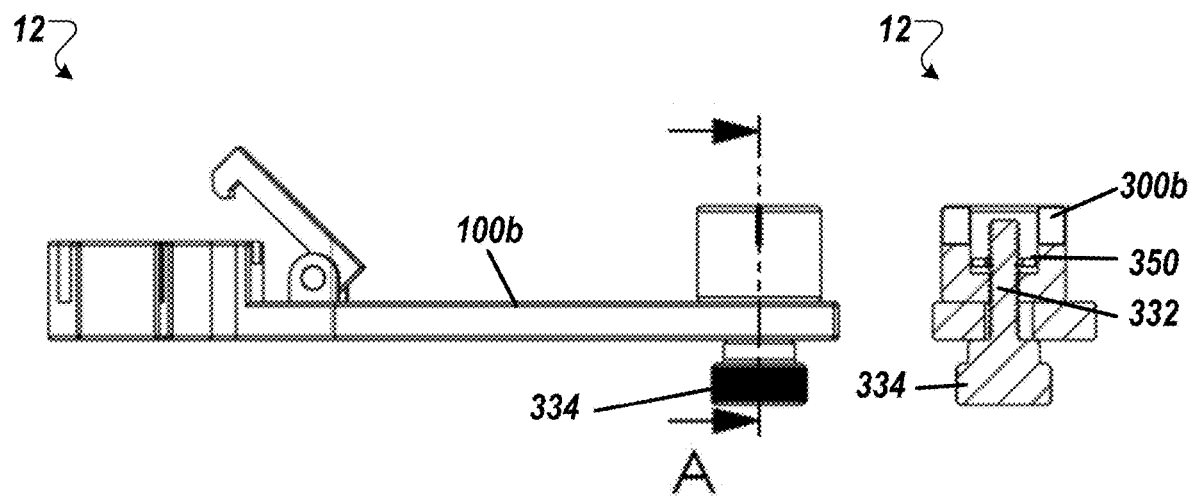
*FIG. 6B*  *FIG. 6C*

DEVICE TO RESTRAIN OPENING OF AN OFF-THE-SHELF SURGICAL INSTRUMENT

CROSS-REFERENCE TO RELATED APPLICATIONS

This application is a continuation of International Application PCT/US2024/054149, filed Nov. 1, 2024, which claims priority to U.S. Provisional Patent Application No. 63/660,694, filed Jun. 17, 2024, which are incorporated herein by reference in their entirety.

BACKGROUND

Surgical instrumentation (e.g., clamps, forceps) inherently open and close within the boundaries of their design. Their range of motion is limited by the bounds of their construction. While modifications of these instruments have been made to tailor them to a specific purpose, such modifications often require retooling of a manufacturing process, costing time and money.

There are applications in which restraint of a surgical instrument has value (e.g., prevention of opening too far). If the surgical instrument is attached to an object or tissue that would become materially deformed if overstretched, that object or tissue could become permanently damaged. Therefore, a need exists to restrain surgical instruments without modifying the instrument's inherent design.

SUMMARY

The devices described herein may be used with a variety of commercially available, off-the-shelf surgical or medical instrumentation. These instruments may be a variety of sizes and/or shapes depending on the specific surgical application. For example, a device for elimination or occlusion of the left atrial appendage (e.g., with pockets attached to the side of the device for ease of opening/closing) may implement the restraint and retention device described herein.

The disclosed device is universally compatible with off-the-shelf surgical instruments (e.g., surgical clamps or forceps). As one example, the device has been tested with occlusion devices for the application in the left atrial appendage occlusion; however, it may also be used in other applications where restraint of a surgical instrument is deemed useful.

One implementation of the present disclosure is a device including a main body, a clamp member, and a mechanical stop. The main body extends from a first end to a second end opposite the first end along a curved longitudinal axis. The main body defines a channel extending (i) from a first surface of the main body towards on opposite second surface of the main body and (ii) along a portion of the main body parallel to the curved longitudinal axis. The main body further defines a first slot adjacent to the first end of the main body. The first slot extends in a direction substantially perpendicular to the curved longitudinal axis. The main body further includes a hinge protrusion extending from the first surface of the main body adjacent to the first slot. The clamp member is coupled to the hinge protrusion and movable between an open and a closed configuration wherein. In the closed configuration, the clamp member encloses a portion of the first slot and a free end of the clamp member engages with a catch on the first end of the main body. The mechanical stop is coupled to the channel of the main body and configured to be moved between (i) a stationary configuration wherein the mechanical stop is fixed at a first point in the channel, and (ii) an adjustable configuration wherein the mechanical stop is movable to a second point along the channel of the main body.

In some implementations, the device further includes a first member coupled to and extending from the first end of the main body, the first member defining a second slot.

In some implementations, the second slot is configured to accept a portion of a handle of a handheld device.

In some implementations, the device further includes a second member or handle coupled to and extending from the second end of the main body, the second member or handle defining a plurality of indentions configured to fit a portion of a user's hand.

In some implementations, the main body and the channel are arcuate in shape, matching the curved longitudinal axis.

In some implementations, the curvature of the main body and the channel match an arm pathway of an openable handheld device.

In some implementations, the channel is a rail couplable to the mechanical stop.

In some implementations, the channel is a curved longitudinal opening in the main body extending from the first surface to the second surface of the main body.

In some implementations, the mechanical stop includes threads engageable with a screw, wherein one of the mechanical stop or the screw extends through the curved longitudinal opening in the main body, and the screw and the mechanical stop engage with each other to define the stationary configuration.

In some implementations, the first slot of the main body is configured to accept a first portion of a pair of surgical clamps, and the clamp member is configured to secure the first portion of the surgical clamps within the first slot.

In some implementations, a second portion of the clamps moves with respect to the first portion of the clamps towards the second end of the main body along the first surface of the main body, wherein the mechanical stop limits the motion of the second portion of the clamps towards the second end of the main body.

In some implementations, the mechanical stop is moved to the second point on the channel based on a predetermined maximum opening distance of the clamps.

In some implementations, the first member coupled to the main body further includes a suture tethering channel.

According to another implementation, a system is disclosed, the system including a clamps device and a retention device. The clamps device includes a first arm including a free end and a handle end spaced apart from the free end. The clamps device further includes a second arm coupled to the first arm at a hinge point. The second arm includes a free end and a handle end spaced apart from the free end of the second arm. Each of the free end of the first arm and the free end of the second arm is configured to move towards and apart from each other to grasp an object. The retention device includes a main body extending from a first end to a second end opposite the first end along a curved longitudinal axis. The main body defines a channel extending (i) from a first surface of the main body towards an opposite second surface of the main body and (ii) along a portion of the main body parallel to the curved longitudinal axis. The main body further defines a first slot adjacent to the first end of the main body. The first slot extends in a direction substantially perpendicular to the curved longitudinal axis. The main body further includes a hinge protrusion extending from the first surface of the main body adjacent to the first slot. The retention device further includes a clamp member coupled to the hinge protrusion and movable between an open and a closed configuration. In the closed configuration, the clamp member encloses a portion of the first slot and a free end of the clamp member engages with a catch on the first end of the main body. The retention device further includes a mechanical stop coupled to the channel of the main body and configured to be moved between (i) a stationary configuration wherein the mechanical stop is fixed at a first point in the channel, and (ii) an adjustable configuration wherein the mechanical stop is movable to a second point along the channel of the main body.

In some implementations, the retention device further includes a second member or handle coupled to and extending from the second end of the main body, the second member or handle defining a plurality of indentions configured to fit a portion of a user's hand.

In some implementations, a portion of the handle end of the first arm of the clamps device is disposed within the first slot and retained via the closed configuration of the clamp member.

In some implementations, motion of the handle end of the second arm of the clamps device with respect to the first arm of the clamps device in a direction along the curved longitudinal axis of the main body is limited by the mechanical stop of the retention device.

In some implementations, the system further includes an occlusion device. The occlusion device includes a first clamping portion configured for positioning along a first side of an anatomical structure and a second clamping portion movably connected to the first clamping portion and configured for positioning along an opposite second side of the anatomical structure while the first clamping portion is positioned along the first side. The clamps device is engageable with the occlusion device.

In some implementations, the occlusion device further includes: at least one sleeve coupled to and extending from an outer side of the occlusion device, the at least one sleeve defining an opening on a first end and a first channel extending from the opening. The free end of the first arm of the clamps device is configured to engage with the at least one sleeve.

In some implementations, the second point at which the mechanical stop of the retention device is fixed is based on a predetermined maximum opening distance of the occlusion device.

In some implementations, a first member is coupled to and extends from the first end of the main body, the first member defining a second slot configured to accept a portion of the handle end of the first arm of the clamps device.

According to another implementation, a method of setting a position of a medical instrument is disclosed. The method includes: (1) providing a retention device including: a main body extending from a first end to a second end opposite the first end along a curved longitudinal axis, the main body defining a channel extending (i) from a first surface of the main body towards on opposite second surface of the main body and (ii) along a portion of the main body parallel to the curved longitudinal axis. The main body further defines a first slot adjacent to the first end of the main body, the first slot extending in a direction substantially perpendicular to the curved longitudinal axis. The main body further includes a hinge protrusion extending from the first surface of the main body adjacent to the first slot. The retention device further includes a clamp member coupled to the hinge protrusion and movable between an open and a closed configuration wherein, in the closed configuration, the clamp member encloses a portion of the first slot and a free end of the clamp member engages with a catch on the first end of the main body. The retention device further includes a mechanical stop coupled to the channel of the main body. The method further includes (2) moving the mechanical stop along the channel of the main body to a first position, wherein the first position is based on a desired maximum opening distance of the medical instrument. The method further includes (3) fixing the mechanical stop to the first position in a stationary configuration with respect to the main body.

In some implementations, the method further includes loosening the mechanical stop such that the mechanical stop can move freely with respect to the channel of the main body. The method further includes moving the mechanical stop to a second position spaced apart from the first position along the channel. The method further includes fixing the mechanical stop to the second position in a stationary configuration with respect to the main body.

In some implementations, a method, further including: providing the medical instrument including: a first arm including a free end and a handle end spaced apart from the free end; and a second arm coupled to the first arm at a hinge point, the second arm including a free end and a handle end spaced apart from the free end of the second arm, each of the free end of the first arm and the free end of the second arm configured to move towards and apart from each other to grasp an object; and coupling the medical instrument to the retention device.

In some implementations, a method, wherein coupling the medical instrument to the retention device includes: inserting a portion of the handle end of the first arm into a first slot defined by the main body; and moving the hinge to a closed configuration such that the portion of the handle end of the first arm is retained within the first slot.

In some implementations, a method, wherein the first position of the mechanical stop along the channel is based on a maximum opening distance of the medical instrument.

In some implementations, the method further includes providing an occlusion device, and coupling the occlusion device to the free ends of the first and second arms of the medical instrument such that the occlusion device is expandable via the medical instrument. The first position of the mechanical stop along the channel is based on a maximum opening distance of the occlusion device.

The device is explained in even greater detail in the following drawings. The drawings are merely exemplary and certain features may be used singularly or in combination with other features. The drawings are not necessarily drawn to scale. Dimensional data in the drawings is exemplary only.

Additional advantages will be set forth in part in the description that follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

FIG. 5A shows an image of surgical clamps coupled to a retention device wherein the surgical clamps are in a closed configuration, according to one implementation.

FIG. 5B shows an image of a user handling the retention device and clamps of FIG. 5A, according to one implementation.

FIG. 6A shows a partial exploded view of a retention device, according to another implementation.

FIG. 6B shows a side view of the retention device of FIG. 6A.

FIG. 6C shows a cross-sectional view of the retention device of FIG. 6B along the line A-A.

Figure 1A:
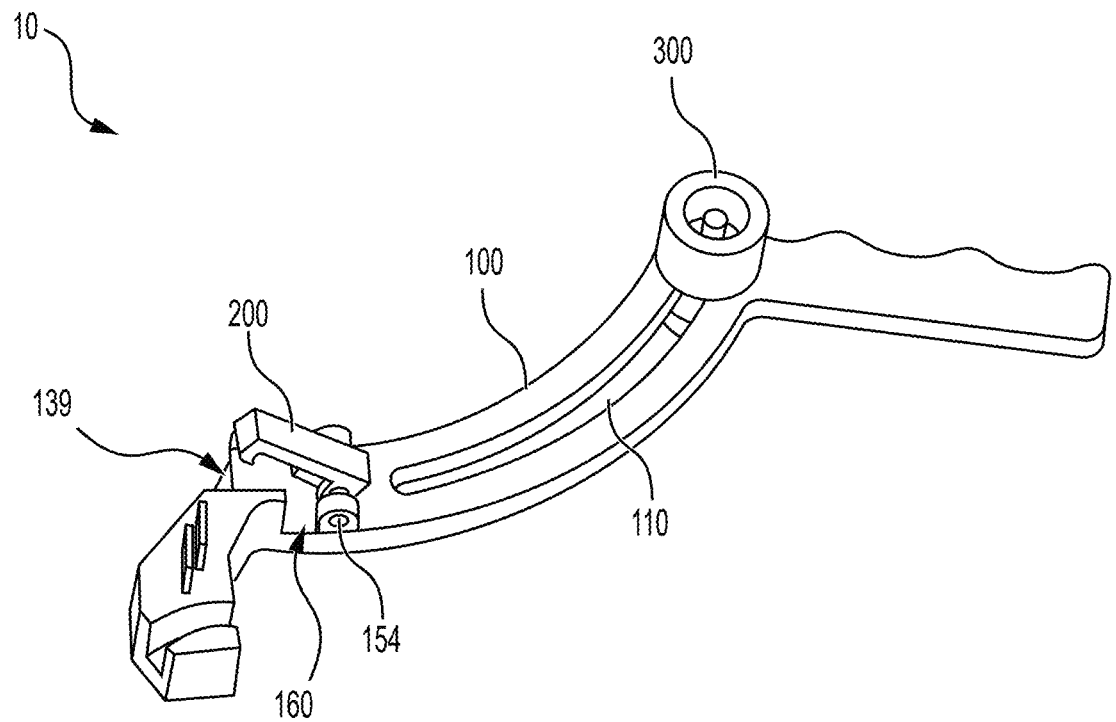
FIG. 1A shows a retention device, according to implementation.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, a retention device for a handheld medical device or surgical instrument is shown, according to various implementations. The disclosed device couples to an off-the-shelf, handheld medical instrument (e.g., surgical forceps or clamps) to limit the movement of the medical instrument. For example, in the case of clamps, the opposing first and second arms of the clamps move between a closed configuration with the free ends of arms touching each other and an open configuration with the free ends of the arms spaced apart. Correspondingly, the handle end of each arm of the clamps also moves between an open and a closed configuration along with the free ends (e.g., at a ratio of expansion based on the length of the arms and the location of the hinge point). In some situations, the maximum distance between the free ends of the arms of the clamps in the open configuration is too large. For example, for certain surgical applications, a narrow anatomical space requires the clamps to limit their total expansion (i.e., the maximum distance or range of motion of the clamps is larger than the distance allowed for the surgical situation).

In other situations, a medical implant or device configured to interact with an anatomical structure (e.g., a clamp or suture) cannot be moved in certain directions or configurations. For example, a clamp for a surgical procedure may need to be implanted without over-expanding the clamp arms.

Therefore, among other advantages, the device of this disclosure provides a solution to the above-described problems. For example, the disclosed device holds, grips, and retains a medical instrument (e.g., clamps) so that a user (e.g., a healthcare professional) may operate the medical instrument with one hand. The disclosed device further provides an ergonomic orientation (e.g., in a "trigger-like" orientation with a handle/grip on one end) that facilitates the single-hand usage. The disclosed device allows the user to open and close the medical instrument within a pre-defined, limited range, facilitating the movement and/or implanting of a medical implant (e.g., an occlusion device or clip).

Example Retention Device #1

Figure 1B:
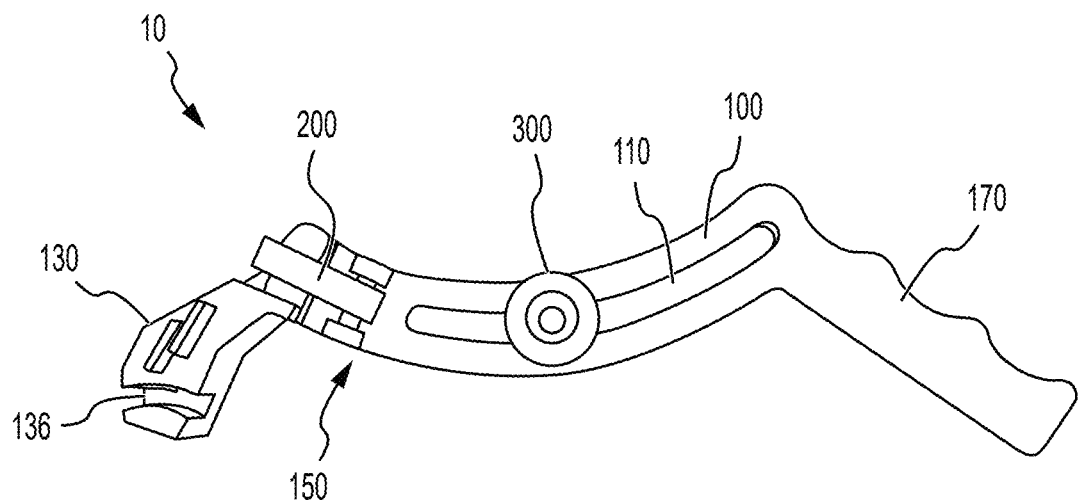
FIG. 1B shows a top view of the retention device of FIG. 1A.
Figure 1C:
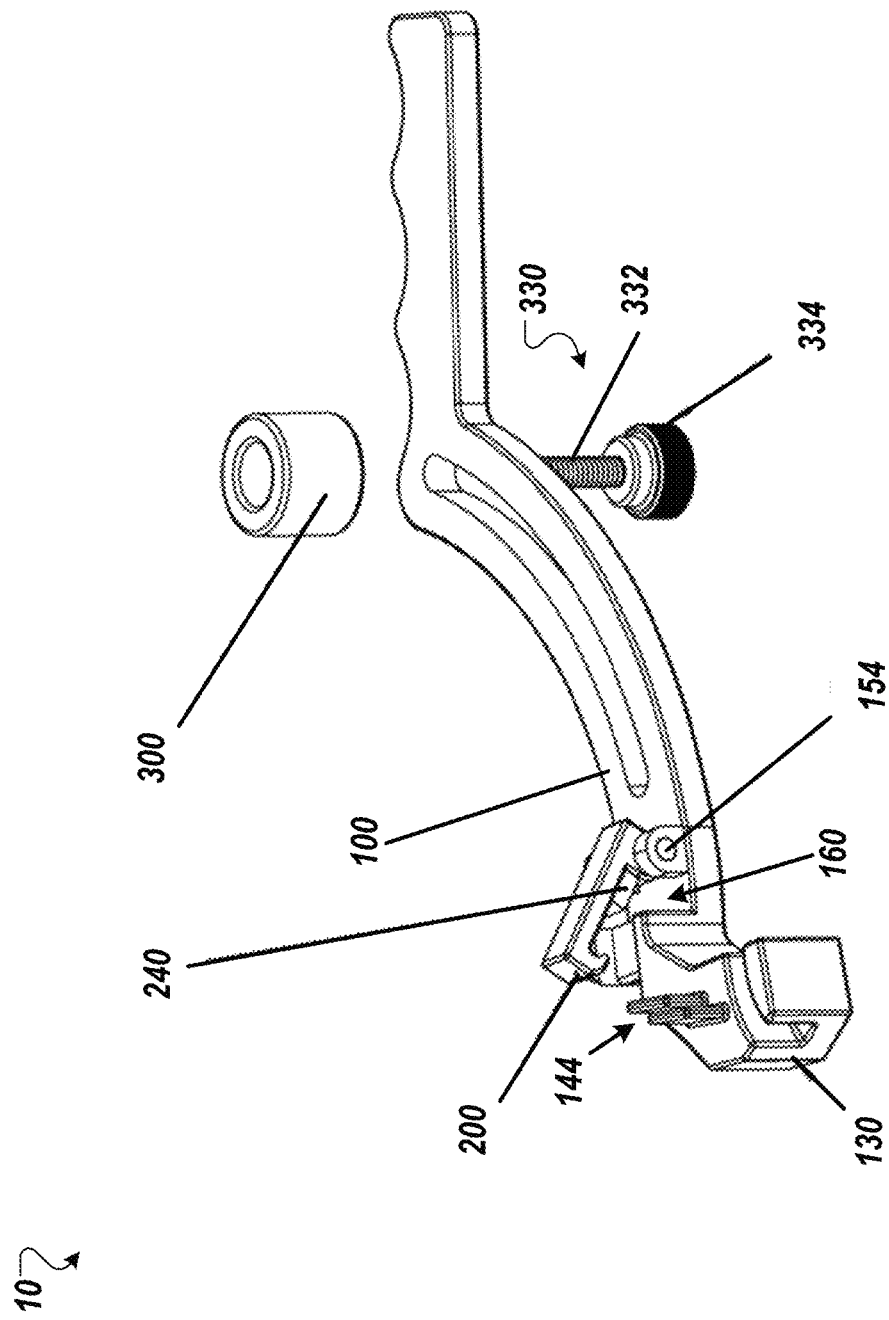
FIG. 1C shows a partial exploded view of the retention device of FIG. 1A.

FIGS. 1A-1C show a retention device 10 according to one implementation of the disclosure. The device 10 includes a main body 100, a clamp member 200, and a mechanical stop 300. The device 10 may have an ergonomic construction with a handle on one end, facilitating use of the device 10 with a single hand. For example, a user (e.g., a healthcare professional) may use one hand to engage a portion of a medical instrument on one end (e.g., a portion retained by the device 10) and a handle portion on an opposite end, providing a trigger-like construction and operation. The device 10 shown may be 3D printed or formed from any other common manufacturing technique (e.g., additive manufacturing or casting). The device 10 may comprise biocompatible or other material capable of being sanitized/sterilized and reused (e.g., plastic, metal, composite, or any other relatively hard and/or rigid material).

Figures 2A, 2B:
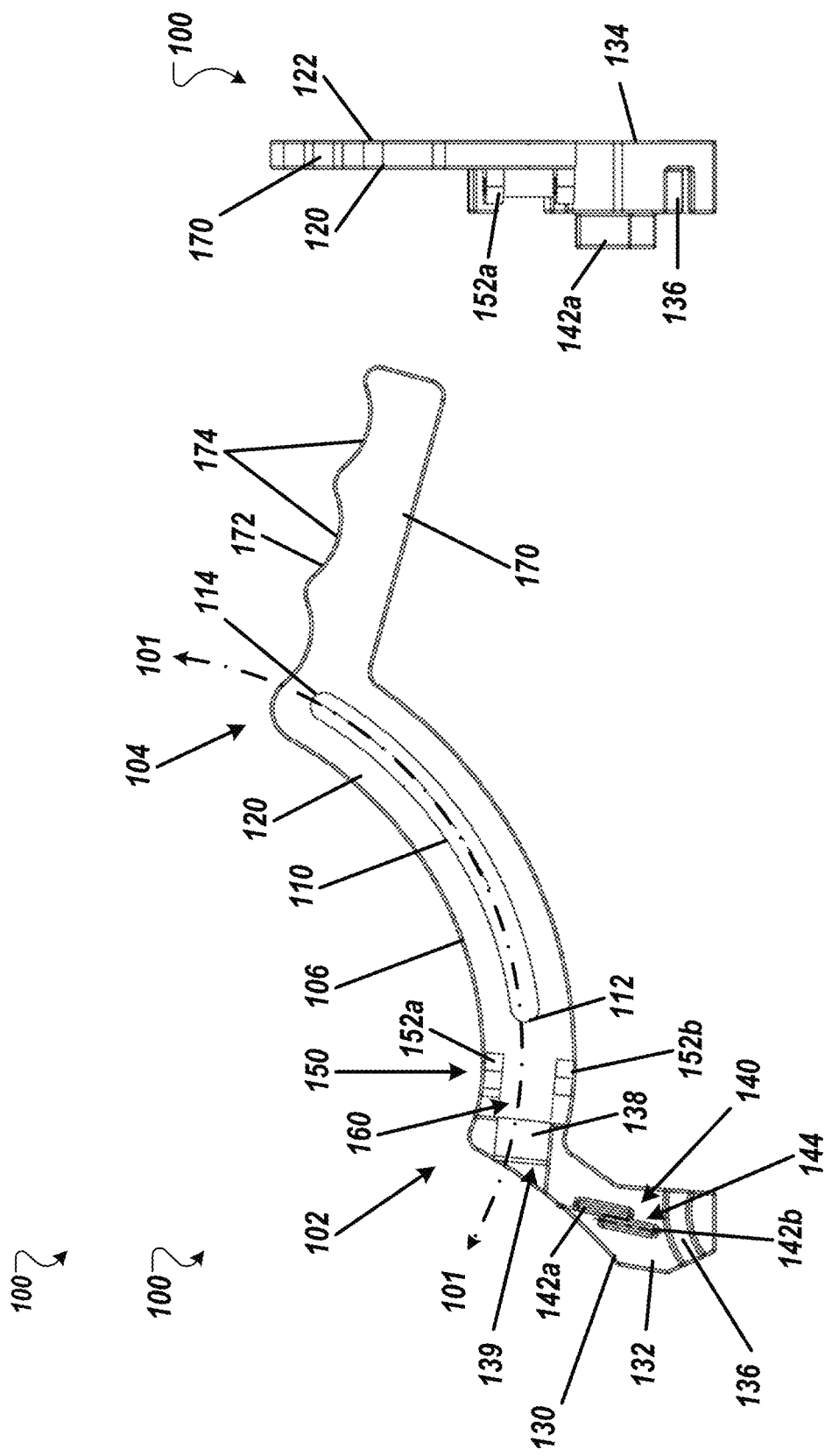
FIG. 2A shows a top view of a main body component of a retention device, according to one implementation.
FIG. 2B shows a side view of the main body of FIG. 2A.

Main Body. The main body 100, shown in further detail in FIGS. 2A-2B, extends from a first end 102 to a second end 104 opposite and spaced apart from the first end 102 along a curved longitudinal axis 101. Specifically, the first end 102 and the second end 104 are defined on opposite sides of a main portion 106 of the main body 100. The main portion 106 extends substantially along the curved longitudinal axis 101. The main body 100 (e.g., the main portion 106 of the main body 100) includes a first surface 120 and a second surface 122 opposite from the first surface 120. The first surface 120 may be defined as an upper surface, and the second surface 122 may be defined as a lower surface.

The main body 100 defines a channel or opening 110. The opening 110 extends from the first surface 120 towards and through the second surface 122. The opening 110 also extends along the main portion 106 of the main body 100 (e.g., along the curved longitudinal axis 101). A first end 112 of the opening 110 is adjacent to, but spaced apart from, the first end 102 of the main body 100. A second end 114 of the opening 110 is adjacent to, but spaced apart from, the second end 104 of the main body 100. Thus, the opening 110 is an arc-shaped opening defined and extending along a substantial portion of the arc-shaped main portion 106 of the main body 100. Because of the curved shape of the main body 100, this disclosure may refer to a "convex" or a "concave" side of the main body 100.

The overall curved shape of the main body 100 and the opening 110 defined therein along the curved longitudinal axis 101 matches the arm pathway of a medical instrument. For example, when clamps or other two-armed medical instruments open and close, the ends of the clamps (e.g., adjacent handle ends) move away from and towards each other along an arc-shaped path. Thus, the main body 100 is formed to substantially match the arc-shaped path of a medical instrument.

The main body 100 further includes a first member 130 coupled to and extending from the first end 102 of the main body 100. The first member 130 extends in a direction transverse to the curved longitudinal axis 101 (e.g., in a direction away from the curved longitudinal axis 101 on a convex side of the main portion 106 of the main body 100). The first member 130 includes an upper surface 132 that is spaced apart from the first surface 120 of the main portion 106 of the main body 100. The first member also includes a lower surface 134 that is coincident with the second surface 122 of the main portion 106 of the main body 100.

The first member 130 defines a slot 136 extending from the upper surface 132 towards the lower surface 134. The slot 136 is configured to receive a portion of a medical instrument (e.g., a portion of a finger ring on a handle end of clamps). Thus, the curvature and/or orientation of the slot 136 extending through the first member 130 is configured to match that of a portion of a medical instrument.

The first member 130 further defines a clip recess 138. The clip recess 138 is a surface offset from the upper surface 132 of the first member 130, leaving a space for the clamp member 200 to close. A portion of the first member 130 includes a snap-fit recess 139 (e.g., a catch) aligned with the clip recess 138 along a pathway of the movable clamp member 200. The snap-fit recess 139 is configured to engage with a free end of the clamp member 200 as further described below.

The first member 130 further includes a suture tether 140 extending from the upper surface 132. The suture tether 140 includes a first protrusion 142a and a second protrusion 142b, wherein a channel 144 is defined between the first protrusion 142a and the second protrusion 142b. The suture tether 140 is configured to receive a portion of a suture thread within the channel 144 and secure the suture thread as needed.

The main body 100 further includes a hinge protrusion 150 extending from the upper surface 132. The hinge protrusion 150 is disposed adjacent to the first end 102 of the main body 100. Specifically, the hinge protrusion 150 is disposed between the first member 130 and the first end 112 of the opening 110. The hinge protrusion 150 includes a first hinge portion 152a and a second hinge portion 152b spaced apart from each other across the main body 100 perpendicular to the curved longitudinal axis 101 (e.g., a direction from the convex side to the concave side of the main body 100). Each of the first and second hinge portions 152a, 152b define an opening configured to accept a pin of a hinge member. For example, in FIGS. 1A-1C, a pin 154 is shown disposed within the hinge protrusion 150, allowing free rotation of the clamp member 200 attached thereto.

The main body 100 defines an arm slot 160 between the first member 130 and the hinge protrusion 150. The arm slot 160 may be referred to as a "handle arm slot" or a "first slot" while the slot 136 of the first member 130 may be referred to as a "ring slot" or a "second slot." The arm slot 160 extends across the main body 100 perpendicular to the curved longitudinal axis 101 (e.g., a direction from the convex side to the concave side of the main body 100). The arm slot 160 is configured to receive a portion of a medical instrument (e.g., a portion of an arm on a handle end of the clamps). Thus, the size and orientation of the arm slot 160 extending across the main body 100 is configured to match that of a portion of a medical instrument.

The main body 100 further includes a second member 170 extending from the second end 104 of the main body 100. The second member 170 extends in a direction transverse to the curved longitudinal axis 101 (e.g., on a convex side of the main body 100 away from the curved longitudinal axis 101). The second member 170 may be a handle 170 facilitating a user's grip and operation of the device 10.

The second member 170 defines a plurality of indentions 174 on an outer surface 172 of the second member 170. The plurality of indentions 174 facilitates gripping and engaging with the main body 100. For example, the plurality of indentions 174 conforms to a user's fingers such that the second member 170 forms a handle and/or leverage point with which a user may engage. For example, the second member 170 may form a "trigger-like" construction wherein a user engages the handle with one or more fingers and a portion of the clamps with their thumb, as further described below.

Figure 3B:
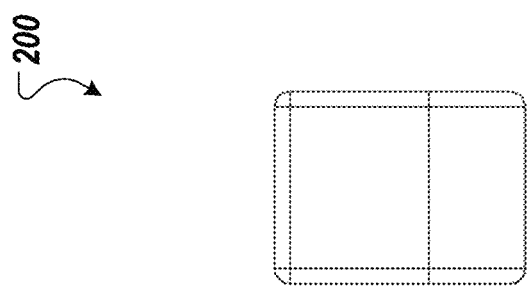
FIG. 3B shows a back view of the clamp member of FIG. 3A.
Figure 3A:
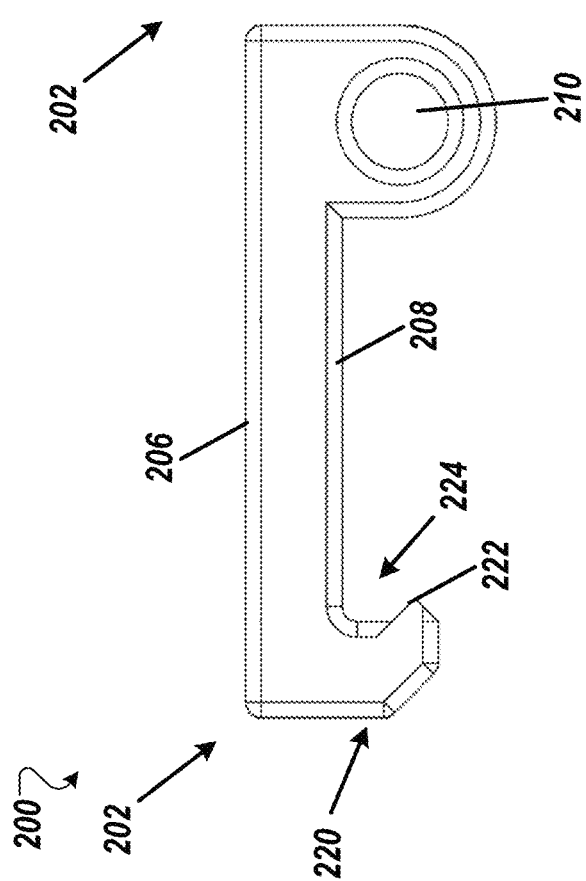
FIG. 3A shows a side view of a clamp member of a retention device, according to one implementation.

Clamp Member. The clamp member 200 of the device 10, shown in further detail in FIGS. 3A-3B, includes a free end 202 and fixed end 204 opposite and spaced apart from the free end 202 in a longitudinal direction. The clamp member 200 includes an outer surface 206 extending between the free end 202 and the fixed end 204. The clamp member 200 further includes an inner surface 208 opposite from the outer surface 206.

The fixed end 204 of the clamp member 200 defines a pin opening 210 extending through the clamp member 200 in a lateral direction that is perpendicular to the longitudinal direction. The pin opening 210 is configured to accept a pin about which the clamp member 200 can rotate.

The free end 202 of the clamp member 200 includes a snap-fit protrusion 220 extending from the inner surface 208. The snap-fit protrusion 220 includes a tip 222 that extends towards the fixed end 204 of the clamp member 200. A recess 224 is defined between the tip 222 and the inner surface 208. The tip 222 of the snap-fit protrusion 220 is engageable with the snap-fit recess 139 of the first member 130, as further described below.

When assembled into the device 10, the clamp member 200 is coupled with the main body 100 via the hinge protrusion 150. Specifically, the fixed end 204 of the clamp member 200 is disposed between the first hinge portion 152a and the second hinge portion 152b of the hinge protrusion 150. The openings in the first hinge portion 152a and the second hinge portion 152b align with the pin opening 210 of the clamp member 200. Then, the pin 154 of the hinge protrusion 150 is inserted into each of the openings (e.g., friction fit or otherwise secured into the openings). The diameter of the pin opening 210 of the clamp member 200 may be slightly larger than the diameters of the openings in the hinge portions 152a, 152b so that the pin 154 secures to the hinge protrusion 150 but allows the clamp member 200 to freely rotate.

The clamp member 200 is movable between an open configuration and a closed configuration with respect to the main body 100. In the closed configuration, the clamp member 200 is rotated about the pin 154 such that the outer surface 206 of the clamp member 200 is substantially parallel with one or both of the first surface 120 of the main body 100 or the upper surface 132 of the first member 130. In the closed configuration, a portion of the inner surface 208 of the clamp member 200 engages with or is disposed adjacent to the clip recess 138 of the first member 130.

In the closed configuration, the free end 202 of the clamp member 200 engages with a portion of the main body 100 to snap into a secure position. For example, the snap-fit protrusion 220 and the tip 222 thereof extend over the clip recess 138 to engage with the snap-fit recess 139. This snap-fit connection locks the clamp member 200 into place until a sufficient force is applied to bend the free end 202 of the clamp member 200 sufficiently to disengage the tip 222 from the snap-fit recess 139.

In the closed configuration, the arm slot 160 is fully enclosed such that any structure disposed therein (e.g., an arm of surgical clamps) is adequately retained. In other words, the arm slot 160 is defined by each of (i) a portion of the first surface 120 of the main body 100, (ii) the hinge protrusion 150, (iii) the first member 130, and—in the closed configuration—(iv) the inner surface 208 of the clamp member 200. In the closed configuration, the arm of the surgical clamps is completely secured so that the user (e.g., medical professional) does not need to hold a portion of the clamps. Instead, the user can hold a portion of the device 10 that holds the clamps while they operate the clamps to move with respect to the device 10 (e.g., opening and closing).

In some implementations, as shown in FIG. 1C, the clamp member 200 includes a rubber portion 240 coupled to the inner surface 208. The rubber portion 240 may be a deformable material (e.g., silicone) adhered to the clamp member 200 (e.g., via adhesive). In the closed configuration, the rubber portion 240 provides both grip and added coupling force between the arm of the clamps and the clamp member 200. Thus, the arm of the clamps is further secured within the arm slot 160, preventing movement thereof and ensuring adequate coupling of the clamps to the device 10.

In the open configuration, the clamp member 200 is rotated about the pin 154 such that the inner surface 208 is substantially perpendicular to one or both of the first surface 120 of the main body 100 or the upper surface 132 of the first member 130. In the open configuration, the arm slot 160 is defined by each of (i) a portion of the first surface 120 of the main body 100, (ii) the hinge protrusion 150, and (iii) the first member 130. However, in the open configuration, the arm slot 160 is open on one side to allow removal and/or insertion of a portion of a medical instrument (e.g., an arm of clamps).

Figure 4A:
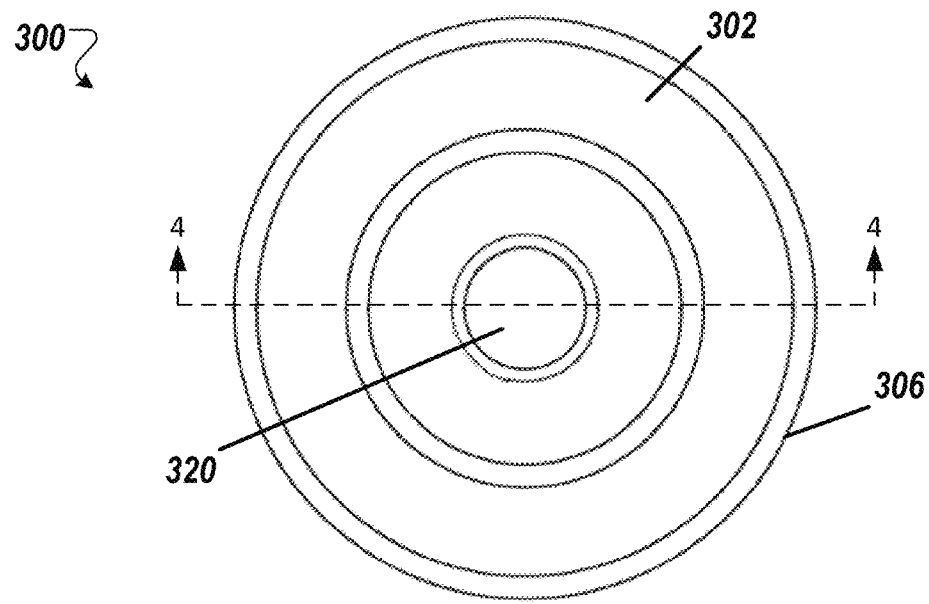
FIG. 4A shows a top view of a mechanical stop component of a retention device, according to one implementation.
Figure 4B:
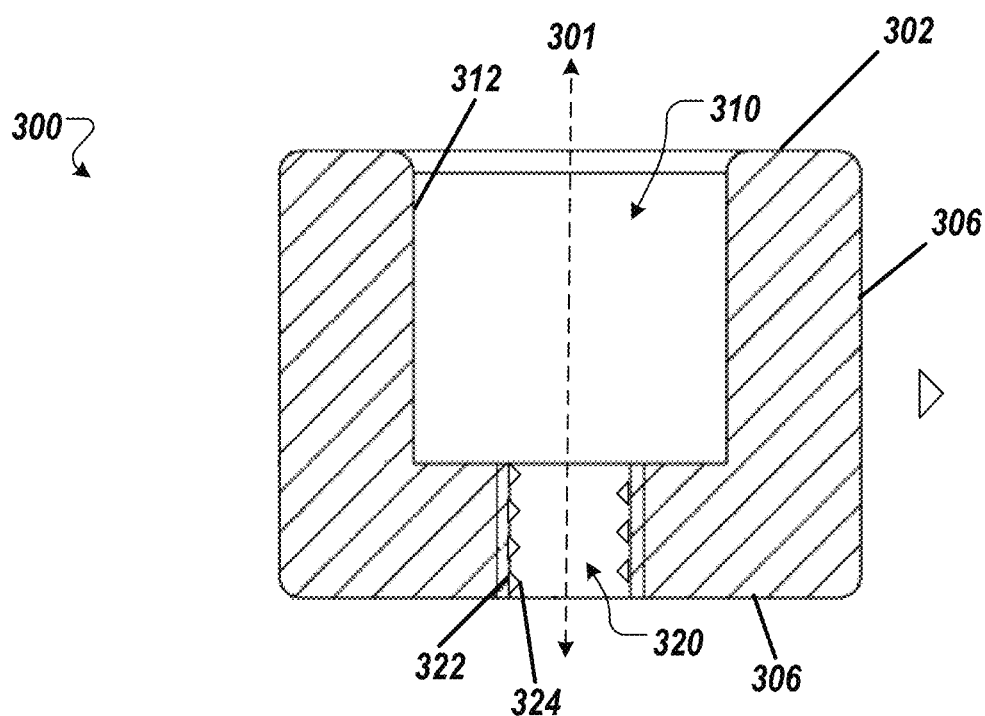
FIG. 4B shows a cross-sectional view of the mechanical stop component of FIG. 4A along line 4-4.

Mechanical Stop. The mechanical stop 300 of the device 10, shown in further detail in FIGS. 4A and 4B, includes a first surface 302 and a second surface 304 opposite and spaced apart from the first surface 302 along a central longitudinal axis 301. The mechanical stop 300 further includes at least one side wall 306 extending between the first surface 302 and the second surface 304. The at least one side wall 306 includes a circular cross-sectional shape when viewed perpendicular to the central longitudinal axis 301. Thus, the at least one side wall 306 is a circular wall extending about the central longitudinal axis 301 to form a substantially cylindrical shape of the mechanical stop 300.

The mechanical stop 300 includes a first recess 310 extending from the first surface 302 towards the second surface 304 along the central longitudinal axis 301. The first recess 310 is defined by a first inner side wall 312 also extending from the first surface 302 towards the second surface 304. The first recess 310 is a circular recess having a first diameter.

The mechanical stop 300 includes a second recess 320 extending from the second surface 304 towards the first surface 302 along the central longitudinal axis 301. The second recess 320 is defined by a second inner side wall 322 also extending from the second surface 304 towards the first surface 302. The second recess 320 is a circular recess having a second diameter that is smaller than the first diameter. The second inner side wall 322 includes a screw thread 324 extending along the second recess 320.

The mechanical stop 300 is engageable with a screw portion 330, shown in FIGS. 1A-1C. The screw portion 330 includes a shank 332 coupled to a head 334 (shown in FIG. 1C). The shank 332 includes a screw thread engageable with the screw thread 324 of the second recess 320. Thus, the screw portion 330 can be screwed into the mechanical stop 300, securing the two components together. In some implementations, the screw portion 330 is considered a portion of the mechanical stop 300. In some implementations (not shown), the mechanical stop is formed with the threaded shank engageable with a separate screw receiver.

When assembled into the device 10, the shank 332 of the screw portion 330 extends through the opening 110 of the main body 100. The shank 332 engages with the mechanical stop 300 by screwing into the thread thereof. Thus, when assembled, the second surface 304 of the mechanical stop 300 abuts the first surface 120 of the main body 100, and the screw portion 330 abuts the second surface 122 of the main body 300. The shank 332 connects the mechanical stop 300 and the screw portion 330 through the opening 110.

Because the screw portion 330 can be screwed into the mechanical stop 300, the screw portion 330 and the mechanical stop 300 can be tightened and/or loosened with respect to each other (e.g., to a desired tightness). For example, the mechanical stop 300 and the screw portion 330 can be tightened together such that the mechanical stop 300 applies a force on the first surface 120 of the main body 100, and the screw portion 330 applies a force on the second surface 122 of the main body 100. The holding force of the screw portion 330 and the mechanical stop 300 fixably couples the mechanical stop 300 in a particular position on the main body 100. Furthermore, the mechanical stop 300 may be loosened with respect to the screw portion 330 such that there is no longer a holding force. When the holding force is removed (i.e., when the mechanical stop 300 is in the loosened state), the mechanical stop 300 and the screw portion 330 coupled thereto are free to move along the opening 110.

For example, as shown in FIG. 1A, the mechanical stop 300 is positioned on the second end 114 of the opening 110. This position may be referred to as a "maximum" position since the mechanical stop 300 cannot move further away from the arm slot 160. The mechanical stop 300 may be tightened with respect to the screw portion 330 so that the mechanical stop 300 is held firmly at the maximum position of FIG. 1A. However, the mechanical stop 300 may be loosened and moved to a different position, as shown in FIG. 1B. Therefore, the mechanical stop 300 is moveable along the opening 110 to any position between the first end 112 and the second end 114 of the opening 110.

As referenced above, the device 10 is configured to retain a medical instrument, referred to herein as clamps (or, a pair of clamps). Clamps 20, shown in FIGS. 5A and 5B, and clamps 20', shown in FIGS. 5C and 5D, include at least the following components. The clamps 20 (and clamps 20') have a first arm 22 and a second arm 24 coupled to each other at a hinge 25. The free end 26 of the first arm 22 and the free end 28 of the second arm 24 are movable between a closed position (where the free ends 26, 28 are touching or near touching) and an open position (where the free ends 26, 28 are spaced apart from one another). The first arm 22 includes a handle end 32, and the second arm 24 also includes a handle end 34, the handle ends 32, 34 being opposite from the free ends 26, 28. The handle ends 32, 34 are also movable between a closed position and an open position, wherein the handle ends 32, 34 are further apart from each other in the open position than in the closed position. The handle ends 32, 34 include finger rings 36, 38 on each arm 22, 24.

Figure 5C:
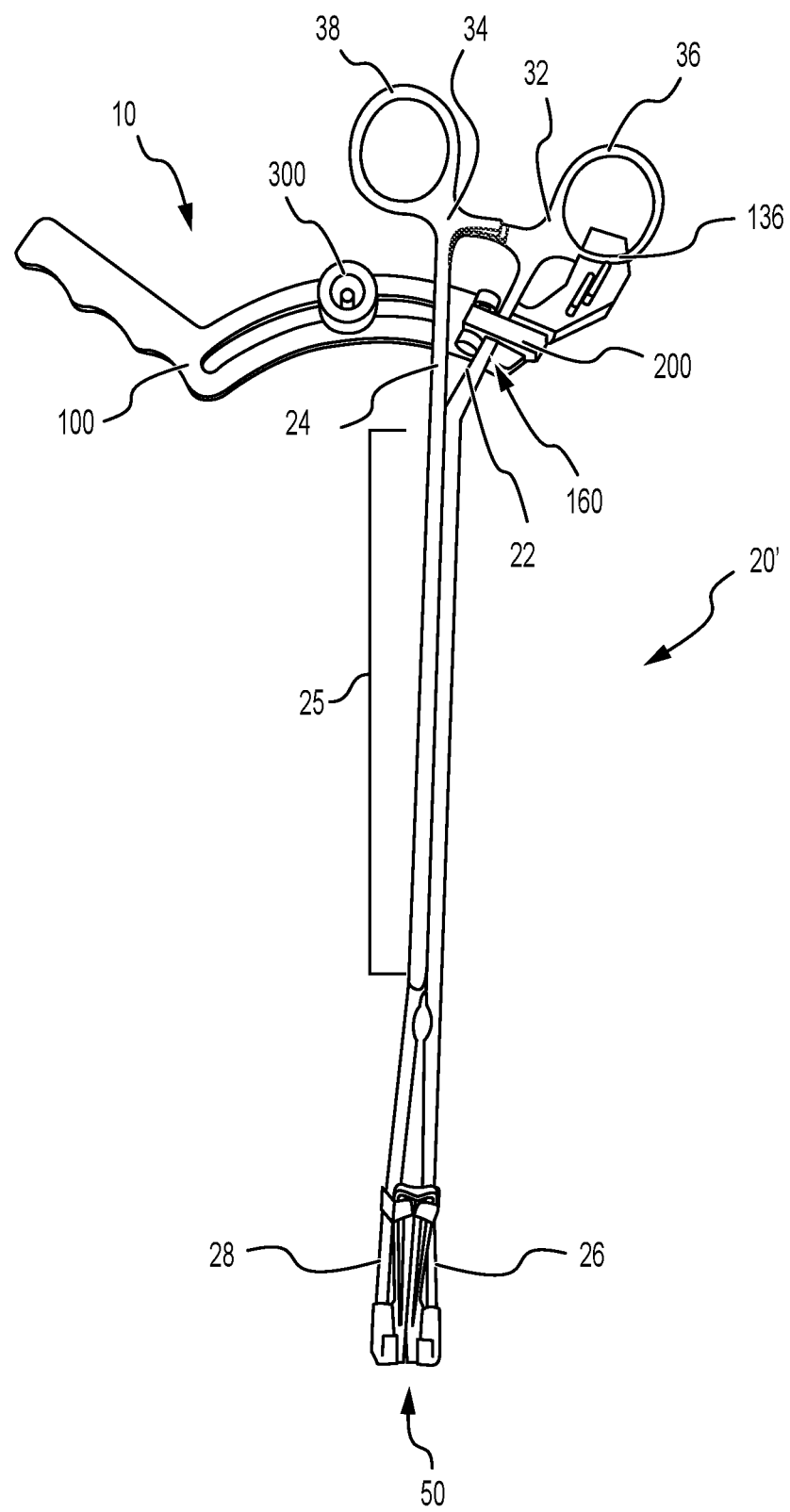
FIG. 5C shows an image of clamps coupled to a retention device, wherein the clamps are in a closed configuration, and wherein the clamps are engaged with an occlusion device, according to one implementation.

FIGS. 5A and 5B show the device 10 engaged with clamps 20. As shown, the first arm 22 is disposed within the arm slot 160 of the main body 100. The clamp member 200 is in the closed configuration, retaining the first arm 22 within the arm slot 160. The finger ring 36 of the first arm 22 is engaged with the slot 136, as will be shown more clearly in other figures (e.g., FIG. 5C).

As shown in FIG. 5B, a user may engage with the finger ring 38 of the second arm 24 and the second member 170, including the plurality of indentions 174 thereon. Thus, the second member or handle 170 forms a trigger-like construction and operation. For example, the user in FIG. 5B holds the handle 170 with their fingers while engaging the finger ring 38 with their thumb. Thus, the user may close their hand to move the thumb closer to the handle 170 (e.g., as in a trigger mechanism) to operate the clamps. The user need not engage with a portion of the first arm 22 because it is retained and/or secured by the device 10. When desired, a user may move the first arm 22 from the closed position towards an open position by moving the finger ring 38 and the second arm 24 towards the second end 104 of the main body 100 (e.g., along a curved pathway following the curved longitudinal axis 101).

The mechanical stop 300 in FIGS. 5A and 5B is fixed at a position in between the first end 112 and the second end 114 of the opening 110. Thus, as the second arm 24 is moved from the closed position towards the open position, the second arm 24 will abut the mechanical stop 300, stopping the progression of the second arm 24. The mechanical stop 300 limits the motion of the second arm 24, thus limiting the overall travel distance of the second arm 24, which limits the extent of the open position of the clamps 20. Depending on the location of the mechanical stop 300 in the opening 110, the free ends 26, 28 of the clamps 20 will extend a predetermined distance from each other, but no more than that predetermined distance. If the predetermined distance needs to be changed, a user may loosen, move, and retighten the mechanical stop 300 in a different location along the opening 110. The change in location of the mechanical stop 300 will change the travel distance of the second arm 24, thus changing the opening distance of the free ends 26, 28 of the clamps 20.

Figure 5D:
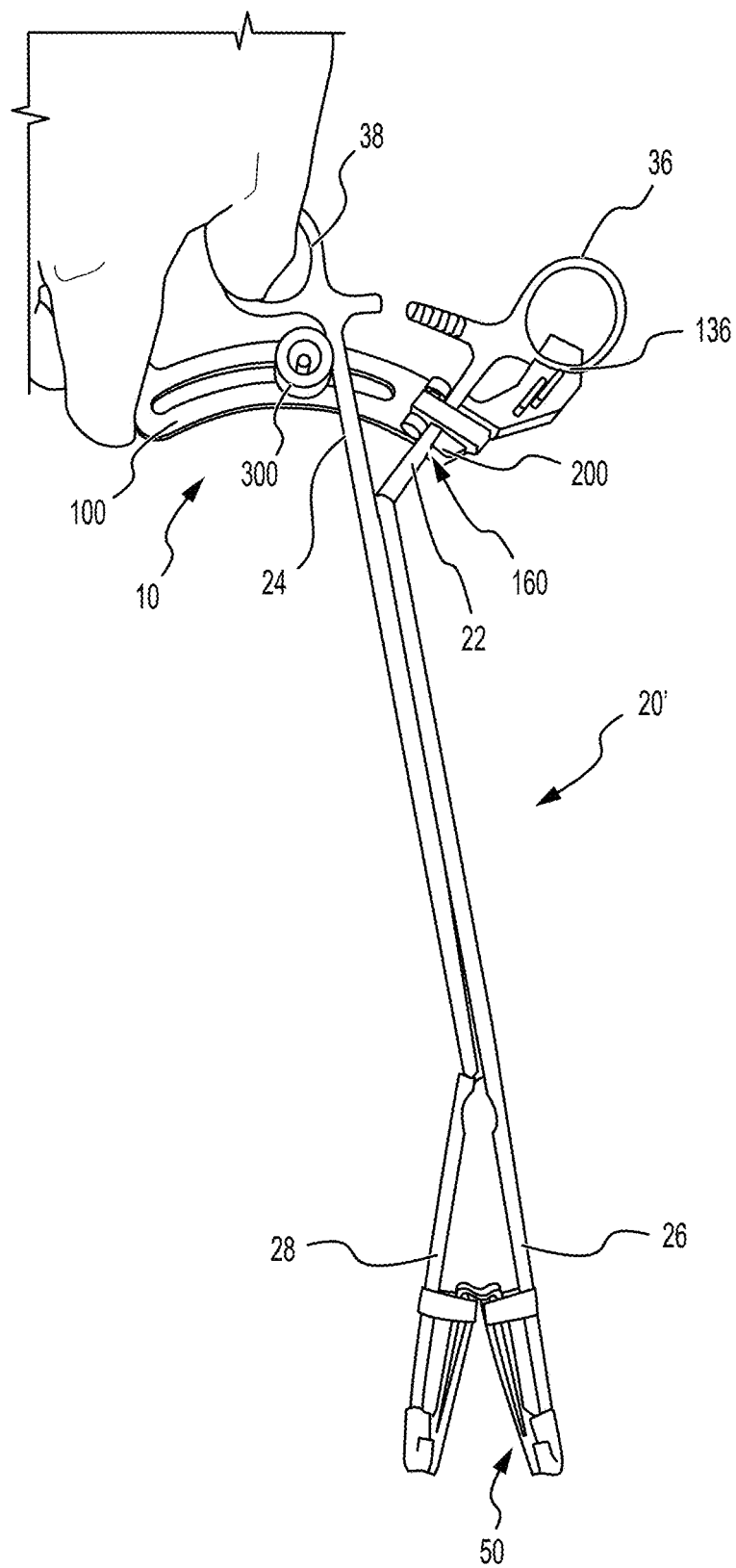
FIG. 5D shows an image of the clamps, retention device, and occlusion device of FIG. 5C, wherein the clamps have been moved to an open configuration by a user engaged with the clamps, according to one implementation.

FIGS. 5C and 5D show a longer pair of clamps 20' retained by the device 10. The clamps 20' are substantially similar to the clamps 20 of FIGS. 5A-5B, except as described below. The clamps 20' in FIG. 5C are shown in the closed position wherein the handle end 34 of the second arm 24 is closest to the handle end 32 of the first arm 22. The clamps 20' in FIG. 5D have been moved to the open position wherein the handle end 34 of the second arm 24 is moved further away from the handle end 32 of the first arm 22. As described above, the mechanical stop 300 limits the movement of the handle end 34 of the handle ends 32 away from the handle end 32 of the first arm 22.

Figure 8:
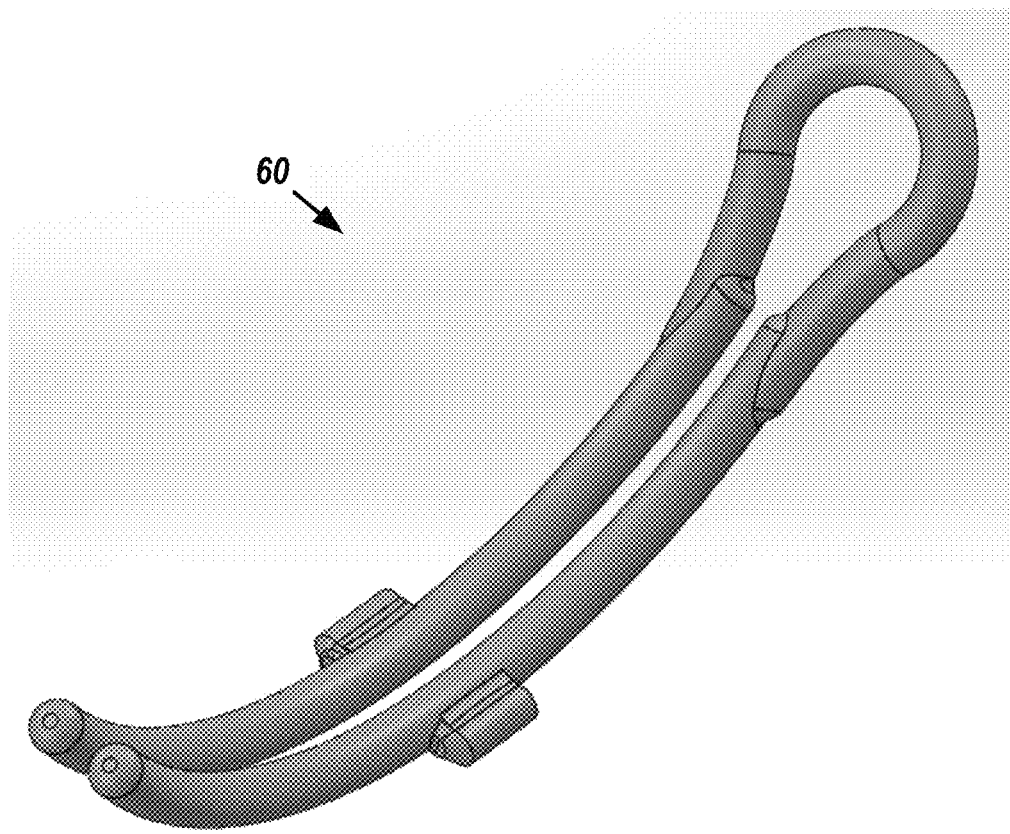
FIG. 8 shows an example occlusion device configured for use with the disclosed retention device, according to one implementation.
Figure 9A:
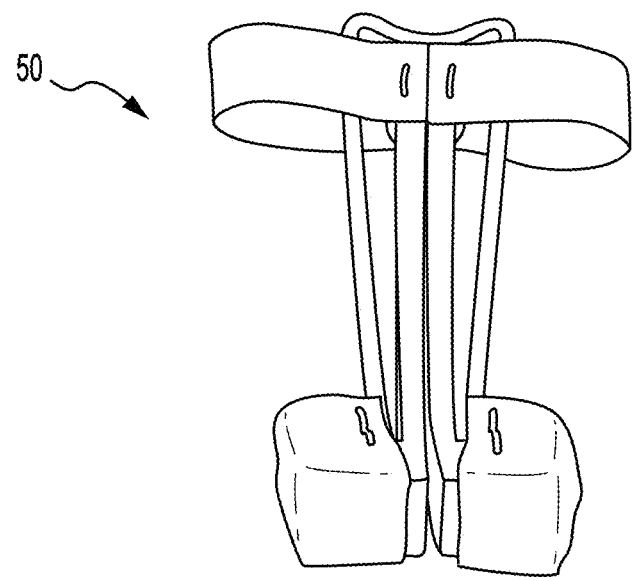
FIGS. 9A and 9B show different views of an example occlusion device configured for use with the disclosed retention device, according to another implementation.
Figure 9B:
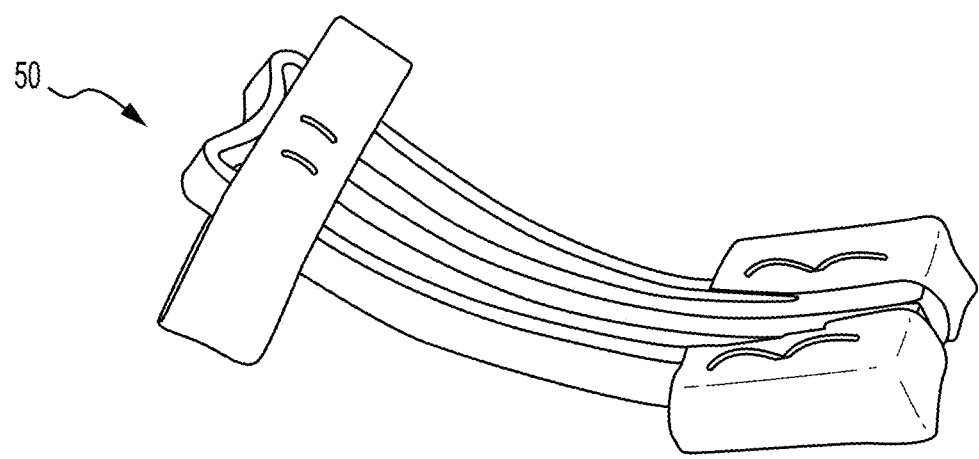

The clamps 20' of FIGS. 5C and 5D is shown engaged with an occlusion device 50. The occlusion device 50 is the same as is shown in FIGS. 9A and 9B. However, a variety of different occlusion devices, clips, implants, and other expandable medical devices may engage with clamps and the retention device of the present disclosure. For example, FIG. 8 shows another occlusion device 60 which may be used in a similar manner as shown in FIGS. 5C-5D. While each of the occlusion devices 50, 60

The free end 26 of the first arm 22 is coupled to a first portion of the occlusion device 50, and the free end 28 of the second arm 24 is coupled to a second portion of the occlusion device 50. In the closed configuration of FIG. 5C, the first and second portions of the occlusion device 50 are separated by a first distance. In the open configuration of the FIG. 5D, the first and second portions of the occlusion device 50 are separated by a second distance that is larger than the first distance. Thus, the separation between the first and second portions of the occlusion device corresponds to the separation between the free end 26 of the first arm 22 and the free end 28 of the second arm 24 of the clamps 20.

The first portion of the occlusion device 50 may be a first clamping portion configured for positioning along a first side of an anatomical structure. The second portion of the occlusion device 50 may be a second clamping portion movably connected to the first clamping portion and configured for positioning along an opposite second side of the anatomical structure while the first clamping portion is positioned along the first side. The clamps may be engageable with the occlusion device 50 via at least one sleeve coupled to and extending from an outer side of the occlusion device 50. The at least one sleeve may define one or more openings and a channel extending from the one or more openings such that the free end of the clamps can extend into the channel of the at least one sleeve.

The occlusion device 50 may have a maximum separation distance before risking breakage of the occlusion device 50. In other implementations, the occlusion device 50 may have a maximum separation distance based on an anatomical pathway wherein the occlusion device 50 will be inserted. Therefore, a user may set the mechanical stop 300 on the device 10 to a particular position that limits the opening pathway of the second arm 24, which limits the opening distance of the free ends 26, 28 of the clamps 20, which limits the maximum separation distance of the occlusion device 50.

In one example, the occlusion device 50 coupled to the clamps 20' that is retained by the device 10 is a system for an epicardial exclusion system for implantation in the left atrial appendage (LAA) of the heart. By permanently excluding the LAA from the left atrium (LA) of the heart using a curved C-Clamp, the blood flow and electrical communication between the LA and the LAA would be eliminated, resulting in fluidic and electrical isolation of the LAA from the remainder of the heart. The occlusion device 50 can be delivered to the operating site using standard surgical clamps (e.g., clamps 20') and expanded to engage with, and clamp onto, the LAA via movement of the clamps 20'.

Example Retention Device #2

FIGS. 6A-6C show a retention device 12 that is substantially similar to the device 10 of FIGS. 1A-1C, except as described below. The main body 100b of the device 12 does not include a second member 170 on the second end 104.

Instead, the main body 100b terminates at the second end 104. Additionally, the first member 130 does not include the suture tether 140 on the upper surface 132.

The mechanical stop 300b of the device 12 includes a self-retaining washer 350. The self-retaining washer 350 sits within the first recess 310. The self-retaining washer 350 engages with the thread of the shank 332 of the screw portion 330 to screw and/or unscrew the screw portion 330 into or out of the mechanical stop 300b. Thus, during tightening, the self-retaining washer 350 engages with the screw portion 330 to force the mechanical stop 300b towards the head 334 of the screw portion 330.

Figure 6D:
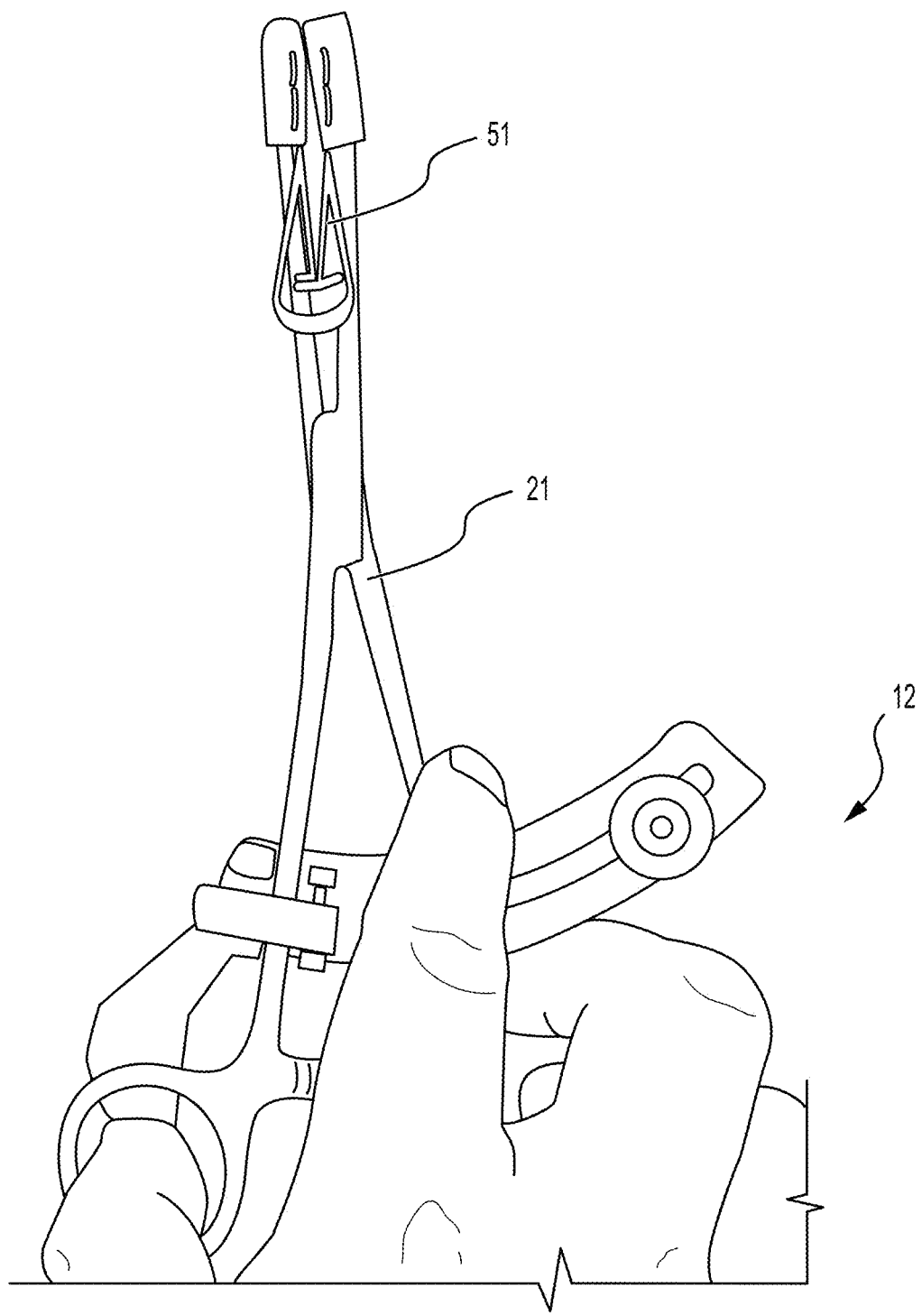
FIG. 6D shows an image of surgical clamps coupled to the retention device of FIG. 6A, wherein the clamps are in a closed configuration, and wherein the clamps are engaged with an occlusion device, according to another implementation.
Figure 6E:
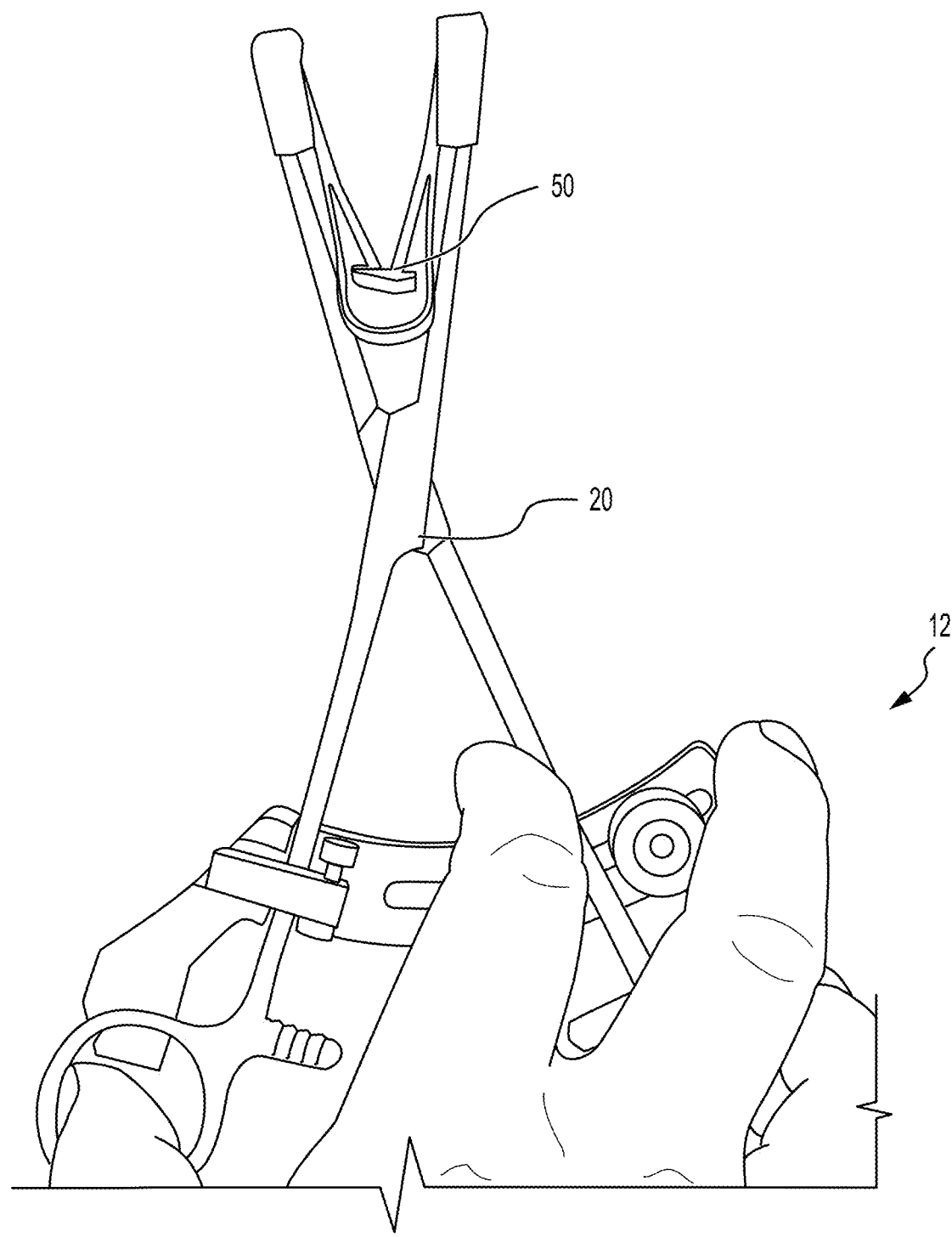
FIG. 6E shows an image of the clamps, retention device, and occlusion device of FIG. 6D, wherein the clamps have been moved to an open configuration by a user engaged with the clamps, according to one implementation.

FIGS. 6D and 6E show the device 12 engaged with the pair of clamps 20 which are engaged with an occlusion device 51 that is substantially similar to the occlusion device 50. FIG. 6D shows the closed position, and FIG. 6E shows the open position.

Example Retention Device #3

Figure 7A:
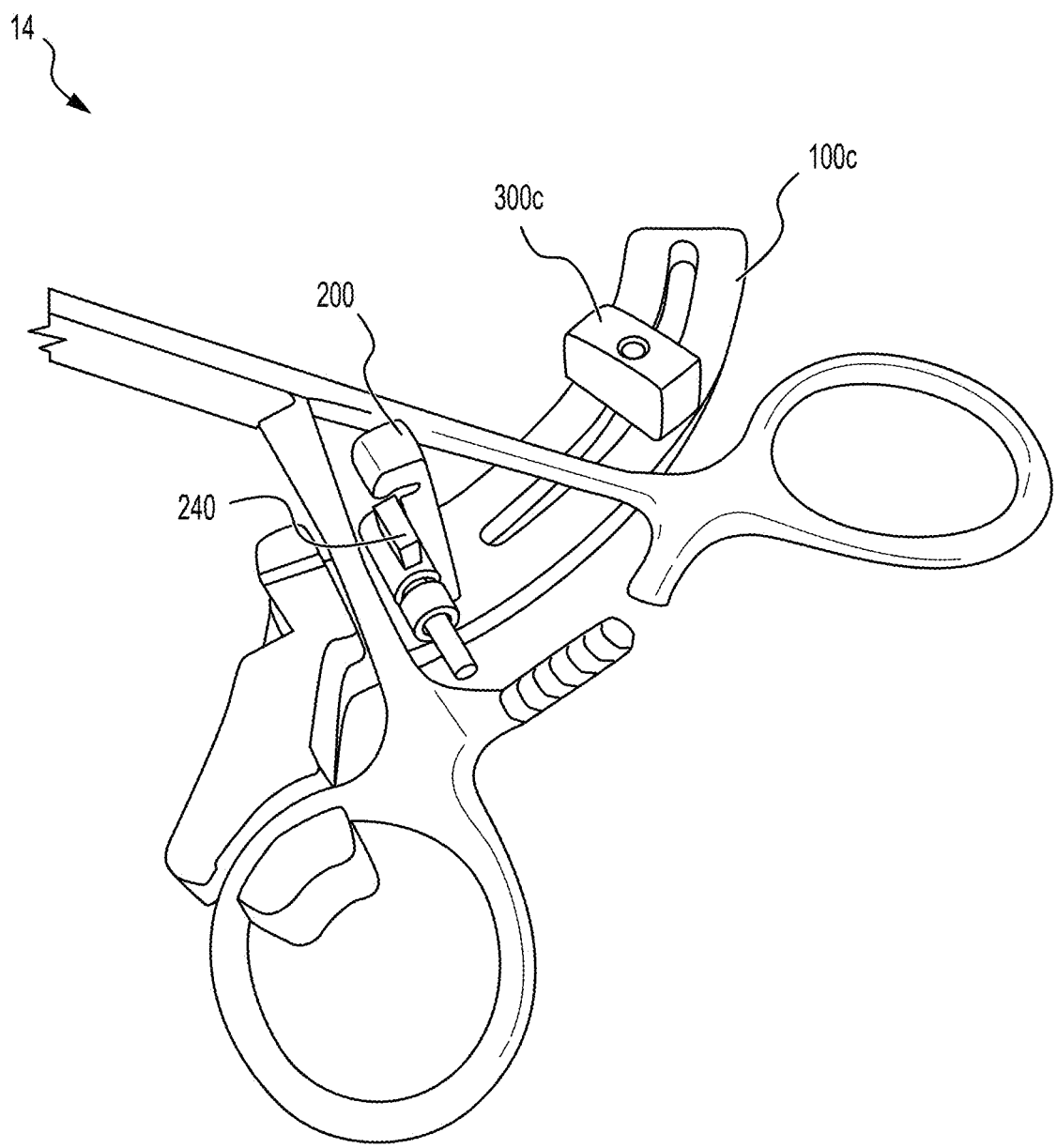
FIG. 7A shows an image of a retention device and clamps, wherein the clamp member is in the open configuration, according to one implementation.
Figure 7B:
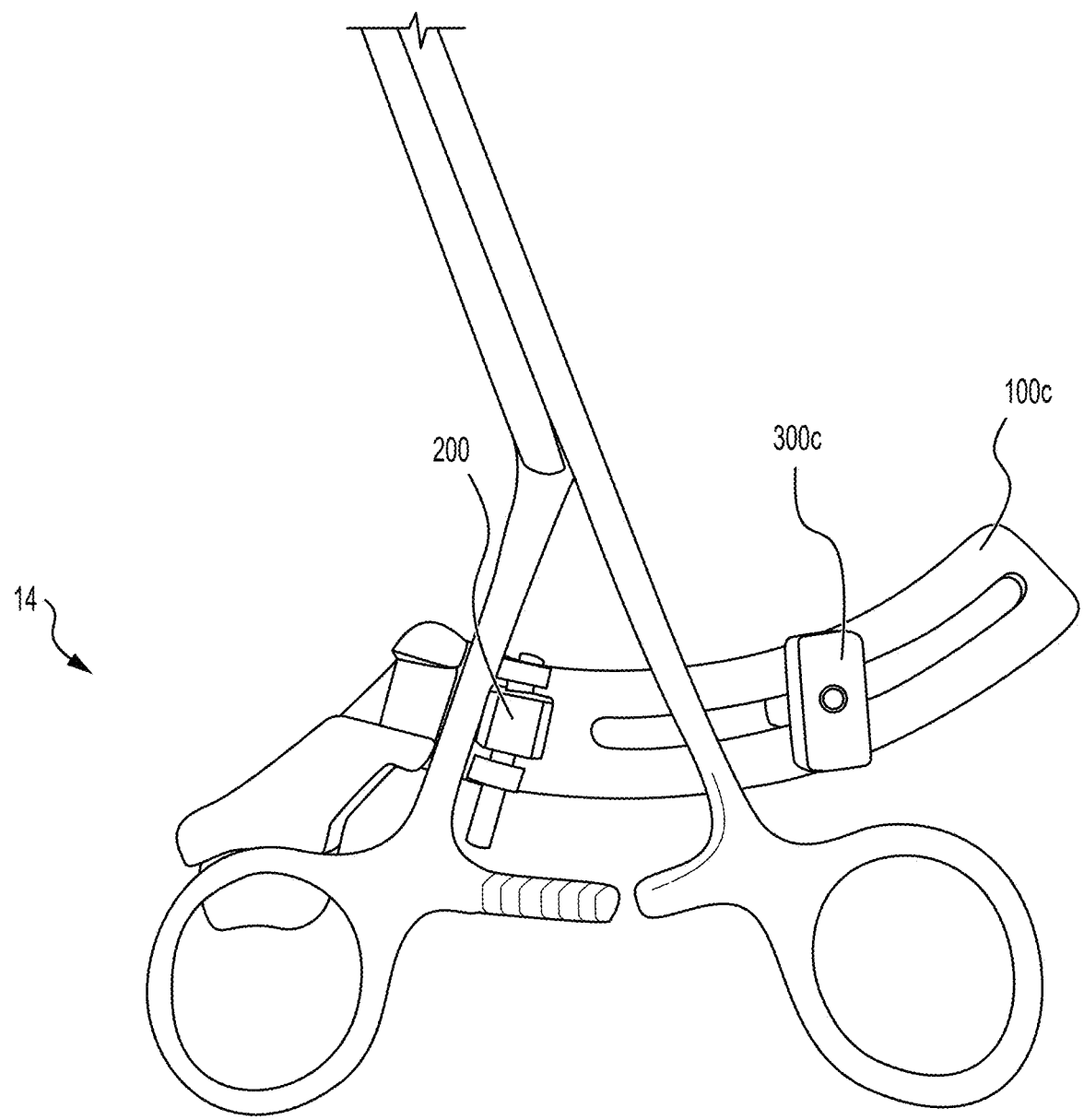
FIG. 7B shows a top view of the retention device and clamps of FIG. 7A.

FIGS. 7A-7B show a retention device 14 that is substantially similar to the device 10 of FIGS. 1A-1C, except as described below. The device 14 is engaged with clamps. Similar to the device 12 of FIGS. 6A-6C, the main body 100c of the device 14 of FIGS. 7A-7B does not include a second member 170 nor a suture tether 140. The clamp member 200 of the device 14, shown in the open position, includes a rubber portion 240, similar to that shown in FIG. 1C.

The mechanical stop 300c of the device 14 is a rectangular shape instead of the circular shape elsewhere shown. The mechanical stop 300c otherwise functions substantially similar to the mechanical stop 300 of the device 10. In other implementations (not shown), the mechanical stop may have a different shape (e.g., square, conical, triangular, gear-shaped, star-shaped, irregular, or any other shape formed to fit on the main body of the device and limit the progression of the clamps arm). In other implementations (not shown), the mechanical stop and/or the screw head of the screw portion include a knurled or texted surface for enhanced gripping capabilities (e.g., to be gripped by a healthcare professional who may be wearing gloves).

Configuration of Certain Implementations

The construction and arrangement of the devices, systems, and methods as shown in the various implementations are illustrative only. Although only a few implementations have been described in detail in this disclosure, many modifications are possible (e.g., variations in sizes, dimensions, structures, shapes, and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

Exemplary Aspects

In view of the described processes and compositions, hereinbelow are described certain more particularly described aspects of the disclosures. These particularly recited aspects should not, however, be interpreted to have any limiting effect on any different claims containing different or more general teachings described herein, or that the "particular" aspects are somehow limited in some way other than the inherent meanings of the language and formulas literally used therein.

Example 1. A device comprising: a main body extending from a first end to a second end opposite the first end along a curved longitudinal axis, the main body defining a channel extending (i) from a first surface of the main body towards on opposite second surface of the main body and (ii) along a portion of the main body parallel to the curved longitudinal axis, wherein the main body further defines a first slot adjacent to the first end of the main body, the first slot extending in a direction substantially perpendicular to the curved longitudinal axis, wherein the main body further comprises a hinge protrusion extending from the first surface of the main body adjacent to the first slot; a clamp member coupled to the hinge protrusion and movable between an open and a closed configuration wherein, in the closed configuration, the clamp member encloses a portion of the first slot and a free end of the clamp member engages with a catch on the first end of the main body; and a mechanical stop coupled to the channel of the main body and configured to be moved between (i) a stationary configuration wherein the mechanical stop is fixed at a first point in the channel, and (ii) an adjustable configuration wherein the mechanical stop is movable to a second point along the channel of the main body.

Example 2. The device according to any example herein, particularly Example 1, further comprising a first member coupled to and extending from the first end of the main body, the first member defining a second slot.

Example 3. The device according to any example herein, particularly Example 2, wherein the second slot is configured to accept a portion of a handle of a handheld device.

Example 4. The device according to any example herein, particularly Examples 1-3, further comprising a second member or handle coupled to and extending from the second end of the main body, the second member or handle defining a plurality of indentions configured to fit a portion of a user's hand.

Example 5. The device according to any example herein, particularly Examples 1-4, wherein the main body and the channel are arcuate in shape, matching the curved longitudinal axis.

Example 6. The device according to any example herein, particularly Examples 1-5, wherein the curvature of the main body and the channel match an arm pathway of an openable handheld device.

Example 7. The device according to any example herein, particularly Examples 1-6, wherein the channel is a rail couplable to the mechanical stop.

Example 8. The device according to any example herein, particularly Examples 1-7, wherein the channel is a curved longitudinal opening in the main body extending from the first surface to the second surface of the main body.

Example 9. The device according to any example herein, particularly Examples 1-8, wherein the mechanical stop comprises threads engageable with a screw, wherein one of the mechanical stop or the screw extends through the curved longitudinal opening in the main body, and the screw and the mechanical stop engage with each other to define the stationary configuration.

Example 10. The device according to any example herein, particularly Examples 1-9, wherein the first slot of the main body is configured to accept a first portion of a pair of surgical clamps, and the clamp member is configured to secure the first portion of the surgical clamps within the first slot.

Example 11. The device according to any example herein, particularly Examples 1-10, wherein a second portion of the clamps moves with respect to the first portion of the clamps towards the second end of the main body along the first surface of the main body, wherein the mechanical stop limits the motion of the second portion of the clamps towards the second end of the main body.

Example 12. The device according to any example herein, particularly Examples 1-11, wherein the mechanical stop is moved to the second point on the channel based on a predetermined maximum opening distance of the clamps.

Example 13. The device according to any example herein, particularly Examples 1-12, wherein the first member coupled to the main body further comprises a suture tethering channel.

Example 14. A system comprising: a clamps device comprising: a first arm comprising a free end and a handle end spaced apart from the free end, and a second arm coupled to the first arm at a hinge point, the second arm comprising a free end and a handle end spaced apart from the free end of the second arm, each of the free end of the first arm and the free end of the second arm configured to move towards and apart from each other to grasp an object; and a retention device comprising: a main body extending from a first end to a second end opposite the first end along a curved longitudinal axis, the main body defining a channel extending (i) from a first surface of the main body towards an opposite second surface of the main body and (ii) along a portion of the main body parallel to the curved longitudinal axis, wherein the main body further defines a first slot adjacent to the first end of the main body, the first slot extending in a direction substantially perpendicular to the curved longitudinal axis, wherein the main body further comprises a hinge protrusion extending from the first surface of the main body adjacent to the first slot; a clamp member coupled to the hinge protrusion and movable between an open and a closed configuration wherein, in the closed configuration, the clamp member encloses a portion of the first slot and a free end of the clamp member engages with a catch on the first end of the main body; and a mechanical stop coupled to the channel of the main body and configured to be moved between (i) a stationary configuration wherein the mechanical stop is fixed at a first point in the channel, and (ii) an adjustable configuration wherein the mechanical stop is movable to a second point along the channel of the main body.

Example 15. The system according to any example herein, particularly Example 14, wherein the retention device further comprises a second member or handle coupled to and extending from the second end of the main body, the second member or handle defining a plurality of indentions configured to fit a portion of a user's hand.

Example 16. The system according to any example herein, particularly Example 14, wherein a portion of the handle end of the first arm of the clamps device is disposed within the first slot and retained via the closed configuration of the clamp member.

Example 17. The system according to any example herein, particularly Examples 14-16, wherein motion of the handle end of the second arm of the clamps device with respect to the first arm of the clamps device in a direction along the curved longitudinal axis of the main body is limited by the mechanical stop of the retention device.

Example 18. The system according to any example herein, particularly Examples 14-17, further comprising: an occlusion device comprising: a first clamping portion configured for positioning along a first side of an anatomical structure; and a second clamping portion movably connected to the first clamping portion and configured for positioning along an opposite second side of the anatomical structure while the first clamping portion is positioned along the first side, wherein the clamps device is engageable with the occlusion device.

Example 19. The system according to any example herein, particularly Example 18, wherein the occlusion device further comprises: at least one sleeve coupled to and extending from an outer side of the occlusion device, the at least one sleeve defining an opening on a first end and a first channel extending from the opening, wherein the free end of the first arm of the clamps device is configured to engage with the at least one sleeve.

Example 20. The system according to any example herein, particularly Examples 18-19, wherein the second point at which the mechanical stop of the retention device is fixed is based on a predetermined maximum opening distance of the occlusion device.

Example 21. The system according to any example herein, particularly Examples 14-20, wherein a first member is coupled to and extends from the first end of the main body, the first member defining a second slot configured to accept a portion of the handle end of the first arm of the clamps device.

Example 22. A method of setting a position of a medical instrument, the method comprising: (1) providing a retention device comprising: a main body extending from a first end to a second end opposite the first end along a curved longitudinal axis, the main body defining a channel extending (i) from a first surface of the main body towards on opposite second surface of the main body and (ii) along a portion of the main body parallel to the curved longitudinal axis, wherein the main body further defines a first slot adjacent to the first end of the main body, the first slot extending in a direction substantially perpendicular to the curved longitudinal axis, wherein the main body further comprises a hinge protrusion extending from the first surface of the main body adjacent to the first slot; a clamp member coupled to the hinge protrusion and movable between an open and a closed configuration wherein, in the closed configuration, the clamp member encloses a portion of the first slot and a free end of the clamp member engages with a catch on the first end of the main body; and a mechanical stop coupled to the channel of the main body; (2) moving the mechanical stop along the channel of the main body to a first position, wherein the first position is based on a desired maximum opening distance of the medical instrument; and (3) fixing the mechanical stop to the first position in a stationary configuration with respect to the main body.

Example 23. The method according to any example herein, particularly Example 22, further comprising: loosening the mechanical stop such that the mechanical stop can move freely with respect to the channel of the main body; moving the mechanical stop to a second position spaced apart from the first position along the channel; and fixing the mechanical stop to the second position in a stationary configuration with respect to the main body.

Example 24. The method according to any example herein, particularly Example 22, further comprising: providing the medical instrument comprising: a first arm comprising a free end and a handle end spaced apart from the free end; and a second arm coupled to the first arm at a hinge point, the second arm comprising a free end and a handle end spaced apart from the free end of the second arm, each of the free end of the first arm and the free end of the second arm configured to move towards and apart from each other to grasp an object; and coupling the medical instrument to the retention device.

Example 25. The method according to any example herein, particularly Example 24, wherein coupling the medical instrument to the retention device comprises: inserting a portion of the handle end of the first arm into a first slot defined by the main body; and moving the hinge to a closed configuration such that the portion of the handle end of the first arm is retained within the first slot.

Example 26. The method according to any example herein, particularly Example 24, wherein the first position of the mechanical stop along the channel is based on a maximum opening distance of the medical instrument.

Example 27. The method according to any example herein, particularly Example 24, further comprising: providing an occlusion device; coupling the occlusion device to the free ends of the first and second arms of the medical instrument such that the occlusion device is expandable via the medical instrument, wherein the first position of the mechanical stop along the channel is based on a maximum opening distance of the occlusion device.

In view of the many possible aspects to which the principles of the disclosed disclosure can be applied, it should be recognized that the illustrated aspects are only preferred examples of the disclosure and should not be taken as limiting the scope of the disclosure. Rather, the scope of the disclosure is defined by the following claims. We, therefore, claim as our disclosure all that comes within the scope and spirit of these claims.

What is claimed is:

1. A device comprising:
    a main body extending from a first end to a second end opposite the first end along a curved longitudinal axis, the main body defining a channel extending (i) from a first surface of the main body towards on opposite second surface of the main body and (ii) along a portion of the main body parallel to the curved longitudinal axis, wherein the main body further defines a first slot adjacent to the first end of the main body, the first slot extending in a direction substantially perpendicular to the curved longitudinal axis, wherein the main body further comprises a hinge protrusion extending from the first surface of the main body adjacent to the first slot;
    a clamp member coupled to the hinge protrusion and movable between an open and a closed configuration wherein, in the closed configuration, the clamp member encloses a portion of the first slot and a free end of the clamp member engages with a catch on the first end of the main body; and
    a mechanical stop coupled to the channel of the main body and configured to be moved between (i) a stationary configuration wherein the mechanical stop is fixed at a first point in the channel, and (ii) an adjustable configuration wherein the mechanical stop is movable to a second point along the channel of the main body.

2. The device of claim 1, further comprising a first member coupled to and extending from the first end of the main body, the first member defining a second slot configured to accept a portion of a handle of a handheld device.

3. The device of claim 1, further comprising a second member or handle coupled to and extending from the second end of the main body, the second member or handle defining a plurality of indentions configured to fit a portion of a user's hand.

4. The device of claim 1, wherein the main body and the channel are arcuate in shape, matching the curved longitudinal axis.

5. The device of claim 1, wherein a curvature of the main body and the channel match an arm pathway of an openable handheld device.

6. The device of claim 1, wherein the channel is a rail couplable to the mechanical stop.

7. The device of claim 1, wherein the channel is a curved longitudinal opening in the main body extending from the first surface to the second surface of the main body.

8. The device of claim 1, wherein the mechanical stop comprises threads engageable with a screw, wherein one of the mechanical stop or the screw extends through the curved longitudinal opening in the main body, and the screw and the mechanical stop engage with each other to define the stationary configuration.

9. The device of claim 1, wherein the first slot of the main body is configured to accept a first portion of a pair of surgical clamps, and the clamp member is configured to secure the first portion of the surgical clamps within the first slot.

10. The device of claim 1, wherein a second portion of the clamps moves with respect to the first portion of the clamps towards the second end of the main body along the first surface of the main body, wherein the mechanical stop limits motion of the second portion of the clamps towards the second end of the main body.

11. The device of claim 1, wherein the mechanical stop is moved to the second point on the channel based on a predetermined maximum opening distance of the clamps.

12. The device of claim 1, wherein the first member coupled to the main body further comprises a suture tethering channel.

13. A system comprising:
   a clamps device comprising: a first arm comprising a free end and a handle end spaced apart from the free end, and a second arm coupled to the first arm at a hinge point, the second arm comprising a free end and a handle end spaced apart from the free end of the second arm, each of the free end of the first arm and the free end of the second arm configured to move towards and apart from each other to grasp an object; and
   a retention device comprising:
      a main body extending from a first end to a second end opposite the first end along a curved longitudinal axis, the main body defining a channel extending (i) from a first surface of the main body towards an opposite second surface of the main body and (ii) along a portion of the main body parallel to the curved longitudinal axis, wherein the main body further defines a first slot adjacent to the first end of the main body, the first slot extending in a direction substantially perpendicular to the curved longitudinal axis, wherein the main body further comprises a hinge protrusion extending from the first surface of the main body adjacent to the first slot;
      a clamp member coupled to the hinge protrusion and movable between an open and a closed configuration wherein, in the closed configuration, the clamp member encloses a portion of the first slot and a free end of the clamp member engages with a catch on the first end of the main body; and
      a mechanical stop coupled to the channel of the main body and configured to be moved between (i) a stationary configuration wherein the mechanical stop is fixed at a first point in the channel, and (ii) an adjustable configuration wherein the mechanical stop is movable to a second point along the channel of the main body.

14. The system of claim 13, wherein a portion of the handle end of the first arm of the clamps device is disposed within the first slot and retained via the closed configuration of the clamp member.

15. The system of any of claim 13, wherein motion of the handle end of the second arm of the clamps device with respect to the first arm of the clamps device in a direction along the curved longitudinal axis of the main body is limited by the mechanical stop of the retention device.

16. The system of claim 13, further comprising:
   an occlusion device comprising:
      a first clamping portion configured for positioning along a first side of an anatomical structure; and
      a second clamping portion movably connected to the first clamping portion and configured for positioning along an opposite second side of the anatomical structure while the first clamping portion is positioned along the first side,
   wherein the clamps device is engageable with the occlusion device.

17. The system of claim 16, wherein the occlusion device further comprises: at least one sleeve coupled to and extending from an outer side of the occlusion device, the at least one sleeve defining an opening on a first end and a first channel extending from the opening, wherein the free end of the first arm of the clamps device is configured to engage with the at least one sleeve.

18. The system of claim 16, wherein the second point at which the mechanical stop of the retention device is fixed is based on a predetermined maximum opening distance of the occlusion device.

19. The system of claim 13, wherein a first member is coupled to and extends from the first end of the main body, the first member defining a second slot configured to accept a portion of the handle end of the first arm of the clamps device.

20. A method of setting a position of a medical instrument, the method comprising:
   (1) providing a retention device comprising:
      a main body extending from a first end to a second end opposite the first end along a curved longitudinal axis, the main body defining a channel extending (i) from a first surface of the main body towards on opposite second surface of the main body and (ii) along a portion of the main body parallel to the curved longitudinal axis, wherein the main body further defines a first slot adjacent to the first end of the main body, the first slot extending in a direction substantially perpendicular to the curved longitudinal axis, wherein the main body further comprises a hinge protrusion extending from the first surface of the main body adjacent to the first slot;
      a clamp member coupled to the hinge protrusion and movable between an open and a closed configuration wherein, in the closed configuration, the clamp member encloses a portion of the first slot and a free end of the clamp member engages with a catch on the first end of the main body; and
      a mechanical stop coupled to the channel of the main body;
   (2) moving the mechanical stop along the channel of the main body to a first position, wherein the first position is based on a desired maximum opening distance of the medical instrument; and
   (3) fixing the mechanical stop to the first position in a stationary configuration with respect to the main body.

21. The method of claim 20, further comprising:
   loosening the mechanical stop such that the mechanical stop can move freely with respect to the channel of the main body;
   moving the mechanical stop to a second position spaced apart from the first position along the channel; and
   fixing the mechanical stop to the second position in a stationary configuration with respect to the main body.

22. The method of claim 20, further comprising:
   providing the medical instrument comprising:
      a first arm comprising a free end and a handle end spaced apart from the free end; and
      a second arm coupled to the first arm at a hinge point, the second arm comprising a free end and a handle end spaced apart from the free end of the second arm, each of the free end of the first arm and the free end of the second arm configured to move towards and apart from each other to grasp an object; and coupling the medical instrument to the retention device;

inserting a portion of the handle end of the first arm into a first slot defined by the main body; and moving the hinge to a closed configuration such that the portion of the handle end of the first arm is retained within the first slot.

23. The method of claim 22, wherein the first position of the mechanical stop along the channel is based on a maximum opening distance of the medical instrument.

24. The method of claim 22, further comprising:

providing an occlusion device;

coupling the occlusion device to the free ends of the first and second arms of the medical instrument such that the occlusion device is expandable via the medical instrument, wherein the first position of the mechanical stop along the channel is based on a maximum opening distance of the occlusion device.

* * * * *

UNITED STATES PATENT AND TRADEMARK OFFICE
CERTIFICATE OF CORRECTION

Page 1 of 1

PATENT NO. : 12,433,710 B1
APPLICATION NO. : 18/962737
DATED : October 7, 2025
INVENTOR(S) : Nahush Mokadam It is certified that error appears in the above-identified patent and that said Letters Patent is hereby corrected as shown below:

In the Claims

Column 19, Line 56:
Please delete:
"The system of any of claim 13 wherein motion of the handle end of the second arm of the clamps device with respect to the first arm of the clamps device in a direction along the curved longitudinal axis of the main body is limited by the mechanical stop of the retention device."
Please insert:
-- "The system of claim 13 wherein motion of the handle end of the second arm of the clamps device with respect to the first arm of the clamps device in a direction along the curved longitudinal axis of the main body is limited by the mechanical stop of the retention device." --

Signed and Sealed this
Sixteenth Day of December, 2025

John A. Squires
*Director of the United States Patent and Trademark Office*